(12) United States Patent
Hashimoto et al.

(10) Patent No.: US 7,808,658 B2
(45) Date of Patent: Oct. 5, 2010

(54) PRINTING SYSTEM AND PRINTING APPARATUS

(75) Inventors: Naoki Hashimoto, Nagoya (JP); Hiroyuki Funahashi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1132 days.

(21) Appl. No.: 11/478,352

(22) Filed: Jun. 30, 2006

(65) Prior Publication Data

US 2007/0013934 A1 Jan. 18, 2007

(30) Foreign Application Priority Data

Jun. 30, 2005 (JP) .......................... P2005-193113
Jun. 30, 2005 (JP) .......................... P2005-193164

(51) Int. Cl.
G06F 3/12 (2006.01)
G06K 1/00 (2006.01)
G06K 15/02 (2006.01)

(52) U.S. Cl. ..................... 358/1.1; 358/1.9; 358/1.11
(58) Field of Classification Search ............. 358/1.1, 358/1.9, 1.11–1.18
See application file for complete search history.

(56) References Cited

U.S. PATENT DOCUMENTS

| | | | |
|---|---|---|---|
| 4,965,771 A * | 10/1990 | Morikawa et al. .......... | 358/1.13 |
| 6,369,909 B1 | 4/2002 | Shima | |
| 6,538,762 B1 * | 3/2003 | Terashima et al. ......... | 358/1.15 |
| 6,906,821 B1 | 6/2005 | Hanazono et al. | |
| 6,927,865 B1 | 8/2005 | Kujirai et al. | |
| 2002/0041386 A1 | 4/2002 | Suzuki et al. | |
| 2002/0059338 A1 | 5/2002 | Nishikawa et al. | |
| 2003/0164973 A1 | 9/2003 | Hisatomi et al. | |
| 2003/0233437 A1 | 12/2003 | Kitada et al. | |
| 2005/0007615 A1 | 1/2005 | Sato | |

FOREIGN PATENT DOCUMENTS

| | | |
|---|---|---|
| EP | 1 043 651 A2 | 10/2000 |
| JP | H04-148269 A | 5/1992 |
| JP | 5-66702 | 9/1993 |
| JP | 5-257620 A | 10/1993 |
| JP | 6-028122 A | 2/1994 |
| JP | H07-044443 A | 2/1995 |
| JP | 11-028803 A | 2/1999 |
| JP | 11-78168 A | 3/1999 |

(Continued)

OTHER PUBLICATIONS

Japanese Office Action, w/ partial English translation thereof, issued in Japanese Patent Application No. JP 2005-193113 dated Jan. 27, 2009.

(Continued)

*Primary Examiner*—Thierry L Pham
(74) *Attorney, Agent, or Firm*—Baker Botts L.L.P.

(57) ABSTRACT

A printing system that includes: a printing condition command receiving unit that receives a primary printing condition command, the primary condition command being included together with printing image data in printing control data; printing condition command converting unit that converts the primary printing condition command to a secondary printing condition command corresponding to a printing apparatus; and a printing apparatus that carries out processing related to printing the printing image data based on the secondary printing condition command.

18 Claims, 21 Drawing Sheets

FOREIGN PATENT DOCUMENTS

| | | |
|---|---|---|
| JP | 2001-067347 A | 3/2001 |
| JP | 2001-111743 A | 4/2001 |
| JP | 2002-55792 | 2/2002 |
| JP | 2002-236565 A | 8/2002 |
| JP | 2002-297341 A | 10/2002 |
| JP | 2003-099228 A | 4/2003 |
| JP | 2003-196045 A | 7/2003 |
| JP | 2004-112794 A | 4/2004 |
| JP | 2004-228709 A | 8/2004 |
| JP | 2005-028878 A | 2/2005 |
| JP | 2005-084892 A | 3/2005 |

OTHER PUBLICATIONS

Extended European Search Report issued in corresponding European Patent Application No. EP 06 25 3448, dated Nov. 8, 2006.

Japan Patent Office; Notification of Reason for Refusal in Japanese Patent Application No. 2005-193113 (counterpart to the above-captioned U.S. patent application) mailed Jul. 24, 2009.

Japanese Notification of Reasons for Refusal, w/ partial English translation thereof, issued in Japanese Patent Application No. JP 2005-193164 dated on Sep. 26, 2008.

* cited by examiner

FIG. 3

PRINTER A

| CONVERSION FORMAT | CONVERSION TARGET COMMANDS 41 / 148 | CONVERSION COMMANDS 42 / 150 |
|---|---|---|
| 0 | <ESC>&l2H (FEED TRAY 2) | ESC&l1H (FEED TRAY 1) |
| 0 | <ESC>&l3H (FEED TRAY 3) | ESC&l1H (FEED TRAY 1) |
| 0 | <ESC>&l4H (FEED TRAY 4) | ESC&l1H (FEED TRAY 1) |
| 0 | <ESC>&l5H (FEED TRAY 5) | ESC&l1H (FEED TRAY 1) |

PRINTER B

| CONVERSION FORMAT | CONVERSION TARGET COMMANDS 41 / 148 | CONVERSION COMMANDS 42 / 150 |
|---|---|---|
| 0 | <ESC>&l1H (FEED TRAY 1) | ESC&l2H (FEED TRAY 2) |

51 55
53

ESC&l3H (FEED TRAY 3)
51 55
53

FIG. 5

PRINTER A

| CONVERSION FORMAT | CONVERSION TARGET COMMANDS 41 / 148w | CONVERSION COMMANDS 42 / 150w |
|---|---|---|
| 0 | <ESC>&l*H (OPTIONAL FEED TRAY) | ESC&l1H (FEED TRAY 1) |

INDIVIDUAL RETRIEVAL AND PERMUTATION

```
ADDRESS   DATA                                        48
 0x00     <ESC>,"&","l","2","H",0x00,0x00,0x00,0x00,0x00,0x00,0x00,0x00,0x00,0x00,0x00,
 0x10     <ESC>,"&","l","3","H",0x00,0x00,0x00,0x00,0x00,0x00,0x00,0x00,0x00,0x00,0x00,
 0x20     <ESC>,"&","l","4","H",0x00,0x00,0x00,0x00,0x00,0x00,0x00,0x00,0x00,0x00,0x00,
 0x30     <ESC>,"&","l","5","H",0x00,0x00,0x00,0x00,0x00,0x00,0x00,0x00,0x00,0x00,0x00,
 0x40     0x00,0x00,0x00,0x00,0x00,0x00,0x00,0x00,0x00,0x00,0x00,0x00,0x00,0x00,0x00,0x00
 0x50     0x00,0x00,0x00,0x00,0x00,0x00,0x00,0x00,0x00,0x00,0x00,0x00,0x00,0x00,0x00,0x00
 0x60     0x00,0x00,0x00,0x00,0x00,0x00,0x00,0x00,0x00,0x00,0x00,0x00,0x00,0x00,0x00,0x00
 0x70     0x00,0x00,0x00,0x00,0x00,0x00,0x00,0x00,0x00,0x00,0x00,0x00,0x00,0x00,0x00,0x00

PERMUTATION COMMAND                                   50
ADDRESS   DATA
 0x80     <ESC>,"&","l","1","H",0x00,0x00,0x00,0x00,0x00,0x00,0x00,0x00,0x00,0x00,0x00,
 0x90     <ESC>,"&","l","1","H",0x00,0x00,0x00,0x00,0x00,0x00,0x00,0x00,0x00,0x00,0x00,
 0xA0     <ESC>,"&","l","1","H",0x00,0x00,0x00,0x00,0x00,0x00,0x00,0x00,0x00,0x00,0x00,
 0xB0     <ESC>,"&","l","1","H",0x00,0x00,0x00,0x00,0x00,0x00,0x00,0x00,0x00,0x00,0x00,
 0xC0     0x00,0x00,0x00,0x00,0x00,0x00,0x00,0x00,0x00,0x00,0x00,0x00,0x00,0x00,0x00,0x00
 0xD0     0x00,0x00,0x00,0x00,0x00,0x00,0x00,0x00,0x00,0x00,0x00,0x00,0x00,0x00,0x00,0x00
 0xF0     0x00,0x00,0x00,0x00,0x00,0x00,0x00,0x00,0x00,0x00,0x00,0x00,0x00,0x00,0x00,0x00
 0xF0     0x00,0x00,0x00,0x00,0x00,0x00,0x00,0x00,0x00,0x00,0x00,0x00,0x00,0x00,0x00,0x00
```

FIG. 9

```
ADDRESS   DATA                                        48
 0x00     <ESC>,"&","l","2","H",0x00,0x00,0x00,0x00,0x00,0x00,0x00,0x00,0x00,0x00,0x00,
 0x10     <ESC>,"&","l","3","H",0x00,0x00,0x00,0x00,0x00,0x00,0x00,0x00,0x00,0x00,0x00,
 0x20     <ESC>,"&","l","4","H",0x00,0x00,0x00,0x00,0x00,0x00,0x00,0x00,0x00,0x00,0x00,
 0x30     <ESC>,"&","l","5","H",0x00,0x00,0x00,0x00,0x00,0x00,0x00,0x00,0x00,0x00,0x00,
 0x40     0x00,0x00,0x00,0x00,0x00,0x00,0x00,0x00,0x00,0x00,0x00,0x00,0x00,0x00,0x00,0x00
 0x50     0x00,0x00,0x00,0x00,0x00,0x00,0x00,0x00,0x00,0x00,0x00,0x00,0x00,0x00,0x00,0x00
 0x60     0x00,0x00,0x00,0x00,0x00,0x00,0x00,0x00,0x00,0x00,0x00,0x00,0x00,0x00,0x00,0x00
 0x70     0x00,0x00,0x00,0x00,0x00,0x00,0x00,0x00,0x00,0x00,0x00,0x00,0x00,0x00,0x00,0x00

PERMUTATION COMMAND          RETRIEVAL
                             <ESC>"&","l"," * ","H"   148w    50
ADDRESS   DATA               PERMUTATION
 0x80     <ESC>,"&","l","1","H",0x00,0x00,0x00,0x00,0x00,0x00,0x00,0x00,0x00,0x00,0x00,
 0x90     <ESC>,"&","l","1","H",0x00,0x00,0x00,0x00,0x00,0x00,0x00,0x00,0x00,0x00,0x00,
 0xA0     <ESC>,"&","l","1","H",0x00,0x00,0x00,0x00,0x00,0x00,0x00,0x00,0x00,0x00,0x00,
 0xB0     <ESC>,"&","l","1","H",0x00,0x00,0x00,0x00,0x00,0x00,0x00,0x00,0x00,0x00,0x00,
 0xC0     0x00,0x00,0x00,0x00,0x00,0x00,0x00,0x00,0x00,0x00,0x00,0x00,0x00,0x00,0x00,0x00
 0xD0     0x00,0x00,0x00,0x00,0x00,0x00,0x00,0x00,0x00,0x00,0x00,0x00,0x00,0x00,0x00,0x00
 0xF0     0x00,0x00,0x00,0x00,0x00,0x00,0x00,0x00,0x00,0x00,0x00,0x00,0x00,0x00,0x00,0x00
 0xF0     0x00,0x00,0x00,0x00,0x00,0x00,0x00,0x00,0x00,0x00,0x00,0x00,0x00,0x00,0x00,0x00
```

PRINTING SYSTEM AND PRINTING APPARATUS

CROSS REFERENCE TO RELATED APPLICATION

This application claims priority from Japanese Patent Applications No. 2005-193164 and No. 2005-193113, filed on Jun. 30, 2005, the entire subject matter of which are incorporated herein by reference.

TECHNICAL FIELD

Aspects of the present invention relate to a printing system and a printing apparatus.

BACKGROUND

As a printing apparatus for executing printing in compliance with printing control data received from a host computer, JP-A-11-78168 discloses a printing apparatus, which incorporates a function of disregarding a printing condition setting command received when the command is not a command that a user requests. This is for preventing inconvenience from occurring, by which the printing condition setting command (printing control data) inputted by the user using a keyboard is changed by the printing condition setting command from the host computer.

SUMMARY

According to an aspect of the invention, there is provided a printing system including: a printing condition command receiving unit that receives a primary printing condition command, the primary condition command being included together with printing image data in printing control data; a printing condition command converting unit that converts the primary printing condition command to a secondary printing condition command corresponding to a printing apparatus; and a printing apparatus that carries out processing related to printing the printing image data based on the secondary printing condition command.

BRIEF DESCRIPTION OF THE DRAWINGS

FIG. 3 is a schematic view depicting a first configuration example of a conversion target command registration section and a conversion command registration section;

FIG. 4 is a schematic view depicting a second configuration example of the conversion target command registration section and the conversion command registration section;

FIG. 5 is a schematic view depicting a third configuration example of the conversion target command registration section and the conversion command registration section;

FIG. 8 is a schematic view depicting a first detailed example of a control data conversion processing;

FIG. 9 is a schematic view depicting a second detailed example of the control data conversion processing;

DETAILED DESCRIPTION

General Overview

Figure 1:
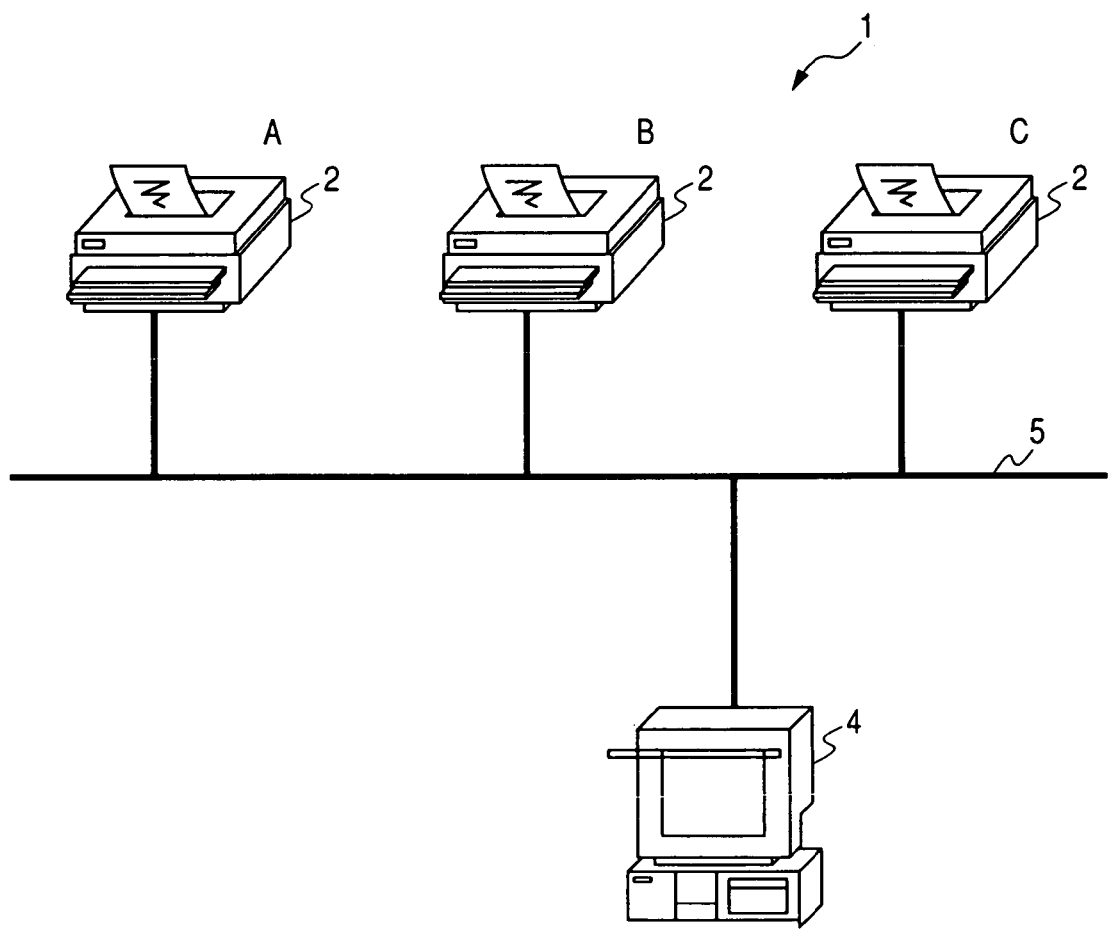
FIG. 1 is a block diagram depicting a brief configuration of a printing system according to an aspect of the invention.

The use conditions of a printing apparatus are adequately determined based on requirements of a user, and it is necessary to inherently determine the contents of the printing control data in compliance with requested use conditions. However, conventionally, where the printing control data prepared by the host computer side are not matched with the printing conditions requested by a user, it becomes necessary for the user to input and set the printing control data at each time. This is troublesome. For example, where a plurality of printing apparatuses are connected to the host computer, and printing output is requested with the printing conditions changed for respective printing apparatuses, it is necessary to set and input printing control data one by one for the respective printing apparatuses at the host computer side. In addition, this is the same in a case where a plurality of host computers are connected to a single printing apparatus. For example, where there is a request in which data of a specified host computer are outputted in a tray 1 while data of printing sources other than the specified host computer are outputted in a tray 2, it becomes necessary to input printing control data to designate a tray before printing at each time. In such a method, not only does the setting input of printing conditions become cumbersome, but also printing is not performed under requested conditions if a mistake arises when inputting. In that situation, it is necessary to perform printing again. However, incorporation of several printer drivers including different printing control data corresponding to respective printing apparatuses at the host computer side causes shortcomings by which a longer time is required for installation. Furthermore, the capacity of a memory device is uselessly consumed. Also, there arises another problem which is a conflict in printer drivers having close hierarchies in terms of processing.

That is, a printing apparatus according to JP-A-11-78168 has no difference from related art printing apparatuses at all in that a user input printing condition setting commands at the printing apparatus side using a keyboard, etc., at each time. Further, even if a function of disregarding an inconvenient command to the user is incorporated, the object thereof is a data protection function for commands transmitted from the host computer side. The function does not contribute to solving an object of saving troublesome work for inputting printing condition setting commands, which is required for printing.

Aspects of the invention provide a printing system and a printing apparatus, which do not require input of cumbersome printing control data to correspond to printing control conditions specific to respective printing apparatuses and can secure a sufficient degree of freedom to vary the printing conditions without excessive enlargement of printing control data to be prepared at the host computer side.

Hereinafter, a description is given of an aspect of the invention with reference to the drawings.

FIG. 1 is a schematic view depicting one aspect of a printing system. The printing system comprises a transmission source apparatus 4 that becomes a transmission source of printing control data that describes as a set of a plurality of printing condition commands to specify the control conditions of printing processing, and a printing apparatus 2 to perform printing processing based on the printing condition commands included in the printing control data received from the transmission source apparatus 4. The aspect is constructed so that a plurality of printing apparatuses 2 are connected to the single transmission source apparatus 4 via communications line 5. The communications line 5 may be made into a wired communications line such as a serial communications cable, a parallel communications cable, and a wired LAN cable, etc., or may be made into a wireless communications line such as a wireless LAN, Bluetooth, etc. Also, it is possible to connect a plurality of transmission source apparatuses 4 to a single printing apparatus 2 via communications lines. It is possible to connect a plurality of printing apparatuses 2 with a plurality of transmission source apparatuses 4 via communications lines.

Figure 2A:
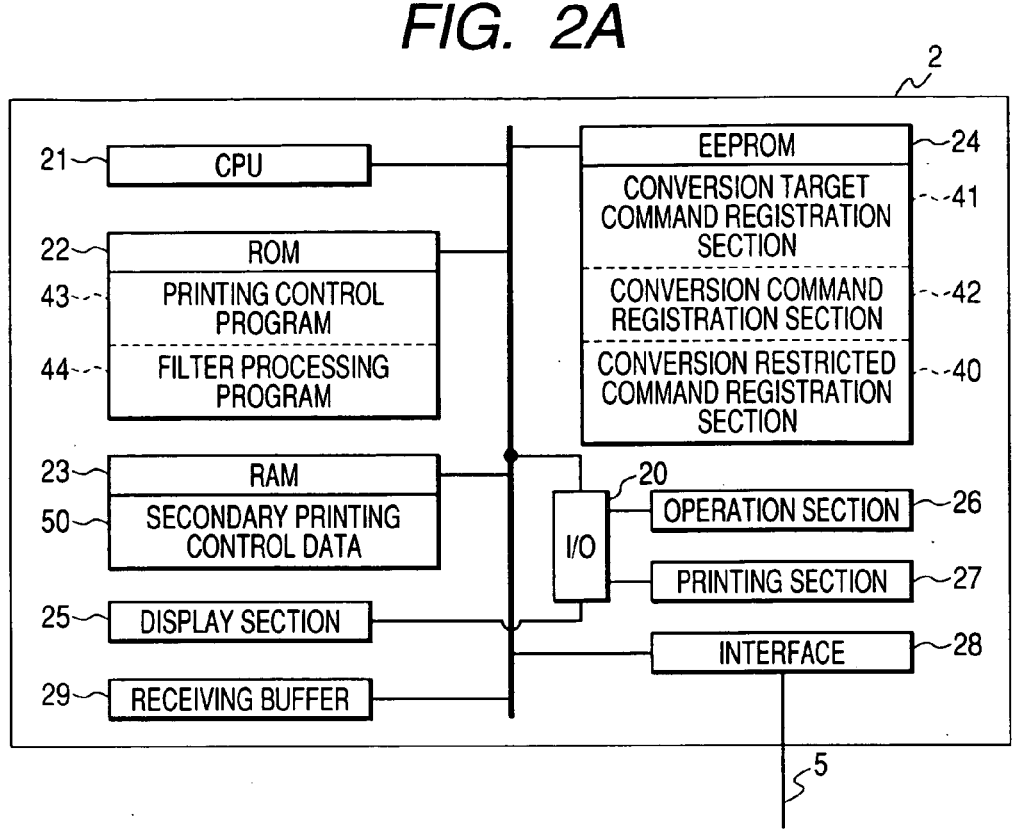
FIG. 2 is a block diagram depicting the internal configuration of a printing apparatus and a transmission source apparatus.
Figure 2B:
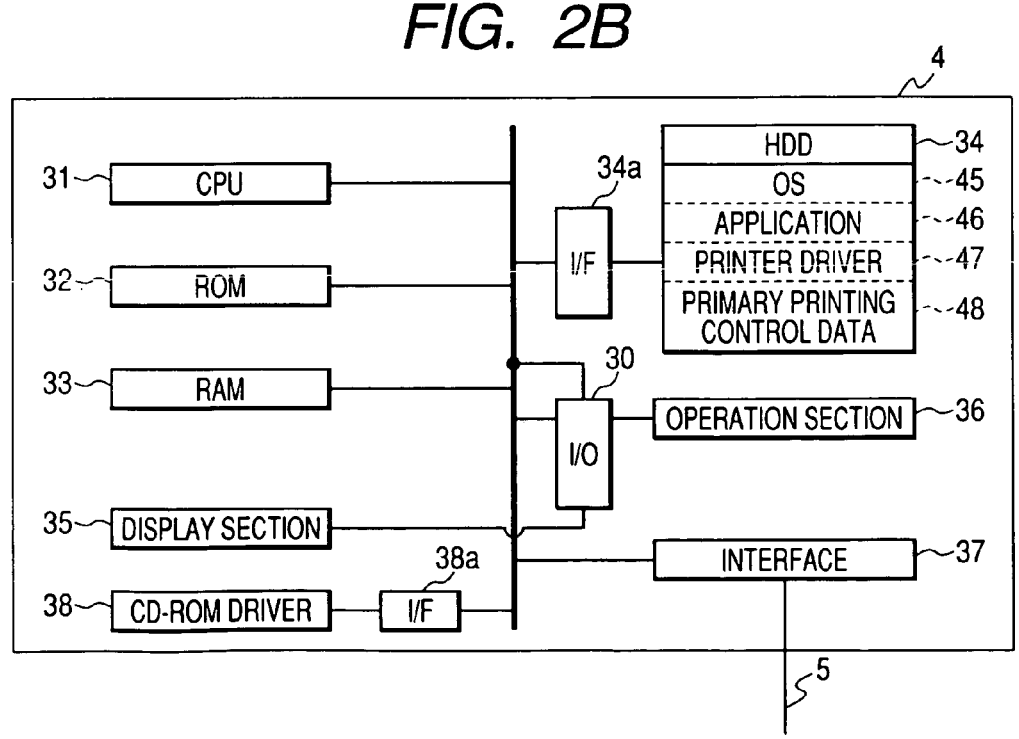

FIG. 2 is a block diagram depicting electric configurations of the printing apparatus 2 and the transmission source apparatus 4. The principal section of the printing apparatus 2 is computer hardware, in which a CPU 21, a ROM 22, a RAM 23, a receiving interface 28 (this is a communications interface concurrently used as a transmission interface: in the drawing, this is merely expressed as an interface) for receiving printing control data from the transmission source apparatus 4 via a communications line 5, a receiving buffer memory 29 (hereinafter merely called a receiving buffer in some cases) for provisionally storing received printing control data, an EEPROM 24 operating as a non-volatile memory, and an input/output section 20 are connected via an internal bus. Further, a printing section 27 composed of an ink jet printing mechanism, a laser printing mechanism, a thermal-transfer printing mechanism, or a dot-impact printing mechanism, each of which has been publicly known, a display section 25 composed of LCD, etc., and an operation section 26 for input, which is composed of a touch panel, pushbutton switches or ten keys, are connected to the input/output (I/O) section 20. A filter processing program 44 described later is stored in the ROM 22. Also, a conversion target command registration section 41 and a conversion command registration section 42, described later, which the filter processing program 44 uses, are formed in the EEPROM 24.

In addition, the transmission source apparatus 4 is a personal computer or a work station, which has been publicly known. The computer hardware section comprises such a configuration in which a CPU 31, a ROM 32, a RAM 33, a communications interface 37 (in the drawing, merely expressed as an interface) for transmitting and receiving data between the same and the communications line 5, and an input/output section 30 are connected to each other via an internal bus. In addition, a storage unit (in this aspect, an HDD is employed) 34 and a CD-ROM driver 38, etc., are connected thereto via interfaces (I/F) 34*a* and 38*a*. Further, a display section 35 composed of an LCD or CRT and an operation section 36 for input, composed of a keyboard or a mouse, are connected to the input/output section 30. An OS 45 that becomes infrastructure software of the transmission source apparatus 4, various types of applications 46 having a printing function, and a printer driver 47 for carrying out printing control instruction processing for the printing apparatus 2 are installed in the storage unit 34. Still further, primary printing control data 48 which composes printing job data prepared by respective applications 46 and becomes a target of printing control processing by the printer driver 47 are also stored in the storage unit 34.

The storage unit 34 secured in the transmission source apparatus 4 functions as a primary printing control data storing unit for storing the primary printing control data 48. The filter processing program 44 stored in the ROM 22 is executed by the CPU 21 and can achieve a function of a printing condition command converting unit for converting the printing condition commands included in the primary printing control data 48 read from the storage unit (primary printing control data storing unit) 34 to secondary printing condition commands 50 to create secondary printing control data that comprises the secondary printing condition commands. The secondary printing control data 50 is specific to a printing apparatus 2 whose control condition contents are different from the corresponding primary printing control data 48. The printing apparatus 2 performs printing processing based on the corresponding secondary printing control data 50 and according to the secondary printing condition commands included therein. Incidentally, the printing apparatus 2 may be configured to perform processing related to printing based on the secondary printing condition commands converted from the primary printing condition commands without creating the set of secondary printing condition commands.

The printing apparatus 2 receives the primary printing control data 48 from the transmission source apparatus 4 via the communications line 5 and the receiving interface 28 (the primary printing control data receiving unit). The received primary printing control data 48 are converted to the secondary printing control data 50 specific to the printing apparatus 2 by the filter processing program 44 in the ROM 22, which achieves a function of the printing condition command converting unit. Printing processing is performed by the printing section (printing processing section) 27 based on the secondary printing control data 50 obtained by the conversion. That is, in the printing system 1 according to the aspect, the printing apparatus 2 is composed so as to comprise a primary printing control data receiving unit and printing condition command converting unit.

In the printing system 1 depicted in FIG. 1, a plurality of printing apparatuses 2 are connected to the transmission source apparatus 4. In FIG. 2, the primary printing control data 48 stored in the storage unit 34 of the transmission source apparatus 4 are commonly used in the plurality of printing apparatuses 2. The respective printing apparatuses 2 convert the common primary printing control data 48 to the secondary printing control data 50 specific to the printing apparatuses 2 one by one by means of the filter processing program 44 in which individually proper conversion processing contents are prescribed. The system performs processing related to printing using the proper secondary printing control data 50.

As depicted in FIG. 8, the printing control data 48 and 50 can be written as a set of a plurality of printing condition commands 148 and 150. The filter processing program 44 performs processing by which a plurality of primary printing condition commands 148 composing the primary printing control data 48 to the secondary printing condition commands 150 that are printing condition commands specific to the respective printing apparatuses 2 are converted. The filter processing program 44 uses the following command registration sections (the respective sections are formed in the EEPROM 24) in order to execute the corresponding processing. The conversion target command registration section 41 registers, in advance, those, which become targets of conversion, among the primary printing condition commands as conversion target commands. The conversion command registration section 42 registers, in advance, conversion commands which are after-conversion printing condition commands corresponding to the conversion target commands as the secondary printing condition commands. The conversion restricted command registration section 40 registers, in advance, type specifying data strings contained in the primary printing condition commands defined as the conversion restricted commands.

The filter processing program 44 retrieves conversion target commands contained in the primary printing control data 48 with reference to the contents of the conversion target command registration section 41 (conversion target command retrieving unit). The program 44 performs control data conversion processing in the form of converting the retrieved conversion target commands to the conversion commands corresponding thereto with reference to the contents of the conversion command registration section 42 (command converting unit). On the other hand, a function of the printing condition command conversion controlling unit is incorporated, which restricts execution of conversion processing to the corresponding conversion restricted commands by the printing condition command converting unit using the types defined in advance of the primary printing condition commands as the conversion restricted commands.

Figure 10:
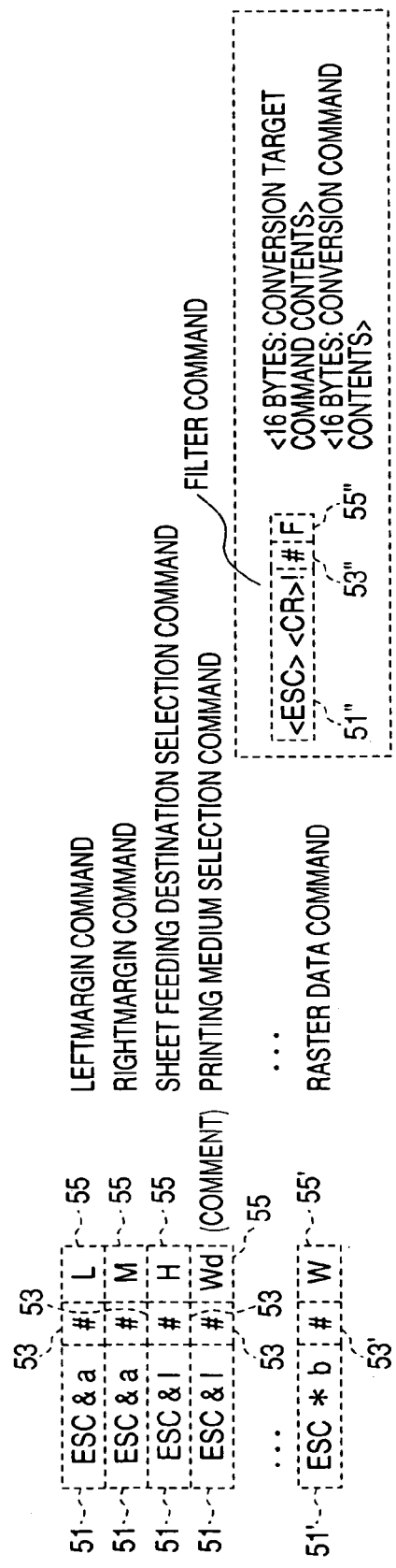
FIG. 10 is a view depicting several examples of printing condition commands.

FIG. 10 depicts several examples of the printing control commands. In either command, a character string of the prescription number (herein, 5 digits) at the head forms the command type specifying sections 51 and 51', and parameter sections 53 and 53' and body end specifying sections 55 and 55' are provided in addition to the command type specifying sections 51 and 51'. A LeftMargin command and a RightMargin command are commands to prescribe the left margin width and the right margin width of a printing area. The parameter section 53 forms a condition specifying section to specify the number of digits of margin. The sheet feeding destination command is a command to specify from which one of a plurality of sheet feeding trays secured in the printing apparatus 2 sheets are fed. The respective trays are uniquely given a tray number, and the parameter section 53 forms a condition specifying section to specify a number (parameters other than numbers (integral numbers), for example, alphabet, etc., may be employed as long as the sequence can be made clear) of a tray from which sheets are fed. A printing medium selection command is a command to specify a material (type) of a medium (sheets of paper) used for printing. A series of medium types that can be used are uniquely given a medium number, and the parameter section 53 forms a condition specifying section to specify the medium number.

Also, although not illustrated, a sheet delivery tray selection command is a command to specify to which one of a plurality of sheet delivery trays secured in the printing apparatus 2 printed matters are delivered. The respective sheet delivery trays are uniquely given a tray number. The parameter section 53 forms a condition specifying section to specify a number of a tray to which sheets are delivered. A printing sheet size selection command is a command to specify the size of medium (sheets of paper) used for printing, wherein a series of sizes that can be used are uniquely given a number of a medium size. The parameter section 53 forms a condition specifying section to specify the medium size number. A sheet insertion direction selection command is a command to specify the insertion direction of medium (sheets of paper) used for printing into the printing apparatus 2. The parameter section 53 forms a condition specifying section to specify whether the insertion direction of medium is longitudinal or lateral, by means of numbers. A printing format selection command is a command to specify the printing format onto a medium (sheets of paper), wherein a series of printing formats that can be employed such as double-sided printing, single-sided printing are sequentially given a printing format number. The parameter section 53 forms a condition specifying section to specify the printing format number, which is actually employed.

In addition, a raster data command shows raster printing image data which become a printing target, wherein the raster data command has such a type in which the command type specifying section 51', parameter section 53' and body end specifying section 55' form a command body. Raster printing image data used for printing are given, following the corresponding command body. That is, the raster printing image data forms a part of the printing control command. The parameter section 53' expresses a data size of the raster printing image data incorporated in a command.

In the present aspect, the command type specifying section 51' of the raster data commands is defined as a type specifying data string, and the command body portion is defined as a conversion processing permitted data string. The remaining raster printing image data portion is made into a conversion processing non-permitted data string, in which execution of the command conversion processing is inhibited.

ESC&1#H is a sheet feeding destination selection command. For example, a numeral of 1 through 4 may be inputted in the portion of #, and the respective numerals indicate TRAY 1, TRAY 2, TRAY 3, and TRAY 4. ESC&13H becomes a command of selecting TRAY 3 as the sheet feeding destination.

The filter processing program 44 converts conversion target commands to conversion commands in compliance with various types of rules. First, as representative processing, the conversion target commands registered in the conversion target command registration section 41 are allowed to perform permutation processing by conversion commands of the same type but having different contents of instruction conditions. In the present aspect, the above-described LeftMargin command, RightMargin command, sheet feeding destination command, printing medium selection command, sheet delivery tray selection command, printing sheet size selection command, sheet insertion direction selection command, and printing format selection command, etc., are made into conversion target commands. The conversion target commands are able to be converted in the form of permutation. In these commands, a plurality of series of printing condition commands, whose printing control target type is the same, having different contents of instruction conditions are coped with as one group in the descriptive system of the printing condition commands. The printing condition commands forming the groups are written so as to comprise a group specifying section to specify the corresponding respective groups and a condition specifying section to specify in which one of a plurality of contents of instruction condition belonging to the corresponding group the printing condition command is included. Specifically, in these commands, the above-described command type specifying section 51 forms the group specifying section. The parameter section 53 forms the condition specifying section. In addition, in either command is given in such a manner that the body end specifying section 55 identifies the end of the command itself, any effective command composing information is not provided after the corresponding body end specifying section 55.

The filter processing program 44 performs permutation processing of the conversion target commands of the form of permutation to conversion commands having the same contents of the command type specifying section (group specifying section) 51 as the corresponding conversion target commands but having different contents of the parameter section (condition specifying section) 53. FIG. 3 and FIG. 4 depict an actual example of the setting contents of conversion target command registration section 41 and the conversion command registration section 42 where the sheet feeding tray selection command is taken for instance. FIG. 3 is a registration setting example in a case where, in the printing apparatus (printer) A of FIG. 1, the sheet feeding tray numbers (2 through 5) variously set in the primary printing control data are uniquely set to sheet feeding from a specified sheet feeding tray number (1). Sheet feeding tray selection commands having all the sheet feeding tray numbers that become conversion targets are stored in the conversion target command registration section 42 as conversion target commands 148. A sheet feeding tray selection command that designates the sheet feeding tray number 1 is registered as a conversion command 150 in the conversion command registration section 42 in the form to correspond thereto. On the other hand, FIG. 4 shows a registration setting example in a case where, in the printing apparatus (printer) B of FIG. 1, a sheet feeding tray number (1) uniquely defined in the primary printing control data 48 is set to sheet feeding from other desired sheet feeding tray numbers (2, 3, 4 . . . ).

Next, FIG. 5 shows another method of obtaining a result of conversion equivalent to the conversion processing in the printer A in FIG. 3. That is, a plurality of conversion target commands (sheet feeding tray selection command) registered in the conversion target command registration section 41 of FIG. 3 forms a plurality of conversion target commands having the same contents in the group specifying section 51 but having different contents in the condition specifying section 53. However, in FIG. 5, generalized commands 148w are prepared by commonly encoding the condition specifying section 53 using a so-called wild card command "*." The generalized commands 148w are registered in the conversion target command registration section 41 instead of a plurality of the conversion target commands 148 of FIG. 3. On the other hand, a representative command 150w, in which a specified data value (herein, tray number=1) is substituted in the condition specifying section 53, is registered in the conversion command registration section 42 as a conversion command.

In this case, as depicted in FIG. 9, with respect to the conversion target commands 148 included in the primary printing control data 48, the filter processing program 44 retrieves those in which the command specifying section (group specifying section) 51 are made coincident with the generalized commands 148w. The conversion target command 148 which is made coincident with the corresponding generalized commands 148w performs permutation processing uniquely by the representative command 150w.

Figure 6A:
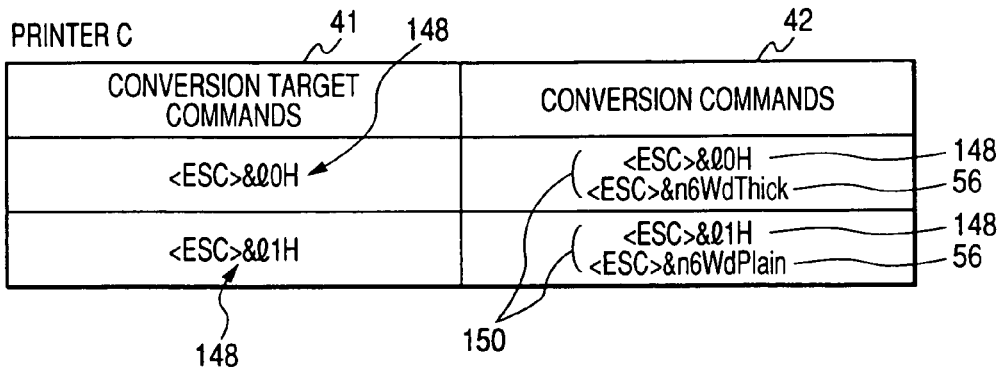
FIG. 6A is a schematic view depicting a fourth configuration example of the conversion target command registration section and the conversion command registration section.
Figure 7:
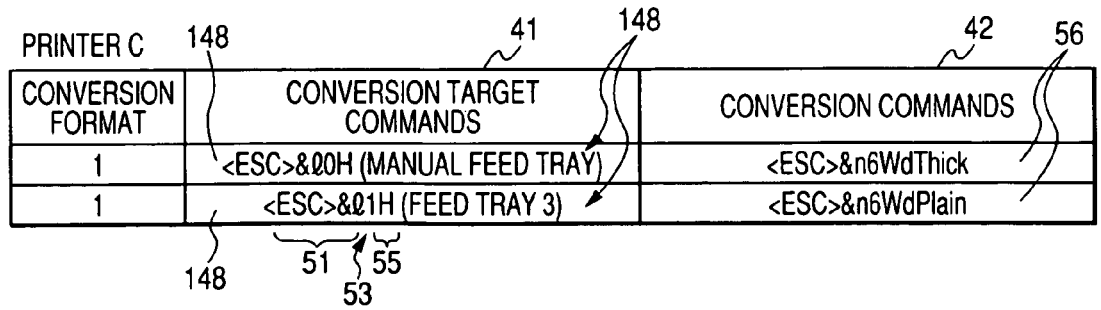
FIG. 7 is a schematic view depicting a fifth configuration example of the conversion target command registration section and the conversion command registration section.

Also, the command conversion processing is not limited to the command permutation processing as described above. For example, as depicted in FIG. 6A, the command conversion processing may be performed to add a printing condition command differing from the corresponding conversion target command 148 to the conversion target command 148. In FIG. 6A, while the conversion target command 148 registered in the conversion target command registration section 41 merely prescribes the type of a sheet feeding tray of the printing apparatus 2, a printing medium selection command to specify the type of printing sheets is registered in the conversion command registration section 42 as a printing condition command to be added by additional processing (hereinafter called an added printing condition command in some cases) 56 along with the above-described conversion target command 148. Further, as depicted in FIG. 7, only the printing condition command 56 to be added by additional processing may be registered in the conversion command registration section 42. In the case of FIG. 6A, since the conversion target command 148 is also registered in the conversion command registration section 42, the processing can be referred to as processing of permuting the conversion target command 148 registered in the conversion target command registration section 41 by "conversion target command 148+added printing condition command 56" registered in the conversion command registration section 42. However, in the case of FIG. 7, since only the added printing condition command 56 is registered in the conversion command registration section 42, the conversion target command 148 is permuted by the added printing condition command 56 if the command conversion processing is executed upon determining as unique permutation processing, wherein a requested result of conversion cannot be obtained. In this case, a flag to specify a conversion format is separately provided, and the permutation processing as in FIG. 3 through FIG. 5 and the additional processing as in FIG. 7 may be identified from each other by the values of the corresponding flag (herein, the flag value="0" indicates permutation processing, and the flag value="1" indicates additional processing).

Figure 6B:
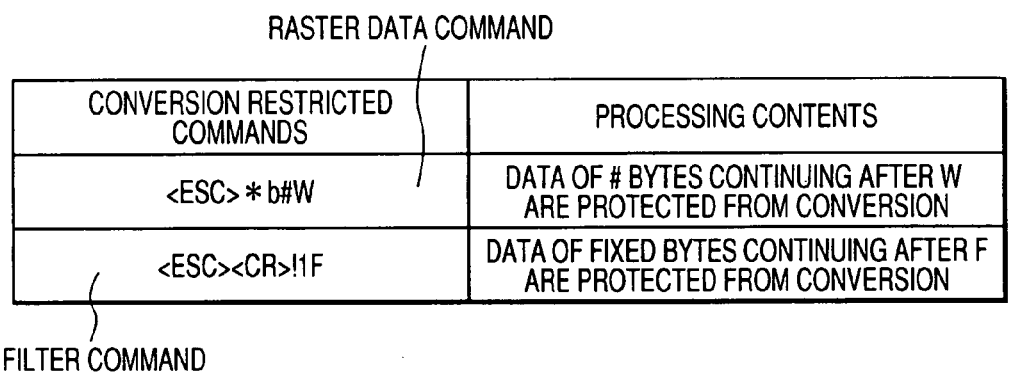
FIG. 6B is a schematic view depicting a configuration example of a conversion restricted command registration section.

Next, with respect to the above-described raster data command, the contents of the command type specifying section 51' disposed at the head of a command are registered in the conversion restricted command registration section 40 as depicted in FIG. 6B. Thus, it is possible to easily specify the raster data command by retrieving commands, in which the corresponding command type specifying section 51' is included, in the primary printing control data. Since the raster data command is a conversion restricted command, it is continuously analyzed where the conversion processing permitted data string ends. In the present aspect, the body end specifying section 55' (W) of the raster data command is defined as an identification code to identify not only the end of the command body but also the boundary between the conversion processing permitted data string and the data string not belonging to the conversion processing permitted data string. In this case, the identification code is registered in the conversion restricted command registration section 40, and a character string that forms a raster data command found is collated with the corresponding registered identification code sequentially from the letter at the head thereof. A range from the corresponding head to the position where the corresponding identification code (W) is found is confirmed as a conversion processing permitted data string, and a subsequent character string (raster printing image data portion) is determined as the conversion processing non-permitted data string.

Where permutation processing is actually performed, after a raster command is copied from the receiving buffer into a conversion memory (formed in the RAM 23 of FIG. 2) in the RAM 23, and the above-described range is determined, the specified conversion processing non-permitted data string is separated and is saved in another memory area (that is, the conversion processing non-permitted data string (raster printing image data) is deleted from the conversion memory). With respect to the conversion processing permitted data strings remaining in the conversion memory, if a data string which is the same as the corresponding conversion processing permitted data string is registered with reference to the conversion target command registration section, the corresponding after-conversion data string (conversion command) is read from the conversion command registration section, and conversion processing is performed. After that, the saved conversion processing non-permitted data strings are re-coupled to the after-conversion-processed conversion processing permitted data strings, and the same is supplied for processing related to printing as the secondary printing condition commands.

A filter command may be exemplified, other than the raster data command, as an actual example of the conversion restricted command. The filter command is a command for registering the conversion target commands and the conversion commands or the conversion restricted command in the respective registration sections 41, 42 and 40 corresponding thereto as depicted in FIG. 10. The contents of the command type specifying section 51" disposed at the head of the command are registered in the conversion restricted command registration section 40 of FIG. 2. By retrieving a command including the corresponding type specifying section 51" in the primary printing control data, it is specified as a conversion restricted command. As in the filter command, the body end specifying section 55" (F) is defined as an identification code, and the corresponding identification code is registered in the conversion restricted command registration section 40. The conversion processing permitted data string and the conversion processing non-permitted data string are determined in the same manner as the raster data command. In the case of the filter command, the conversion processing non-permitted data string is a character string showing the contents of the conversion target command and the character string showing the contents of the conversion command. Also, the parameter section 53" in the filter command shows the registered positions of the conversion target command and the conversion command in the respective registration sections 41 and 42.

Where permutation processing is actually performed, the entirety of conversion restricted commands are copied from the receiving buffer to the conversion memory (formed in the RAM 23 of FIG. 2) in the RAM 23, and the above-described range determining processing is performed. After that, the specified conversion processing non-permitted data string is separated and saved in another memory area (that is, the conversion processing non-permitted data string is deleted from the conversion memory). With respect to the conversion processing permitted data string remaining in the conversion memory, the conversion target command registration section is referred. When a data string which is the same as the corresponding conversion processing permitted data string is registered, the corresponding after-conversion data string (conversion command) is read from the conversion command registration section, and conversion processing is performed. After that, the saved conversion processing non-permitted data string is re-coupled to the after-conversion-processed conversion processing permitted data string and is supplied for processing related to printing as the secondary printing condition commands.

Next, in the aspect, the printer driver 47 of the transmission source apparatus 4 of FIG. 2 realizes the following function-achieving unit as an auxiliary function of the printing condition command converting unit while cooperating with the filter processing program 44 at the printing apparatus 2 side. A conversion permission condition setting unit sets conversion permission conditions defined in advance so as to satisfy the status of use of the printing apparatus 2 in order to permit control data conversion processing to convert the primary printing control data 48 to the secondary printing control data 50. A conversion permitted determining unit detects the status of use of the printing apparatus 2 and determines whether or not the corresponding status of use detected satisfies the set conversion permission establishing conditions. A conversion permitting unit permits the printing condition command converting unit to execute control data conversion processing where it is determined by the above-described conversion permitted determining unit that the conversion permission establishing conditions are sufficient.

Figure 11:
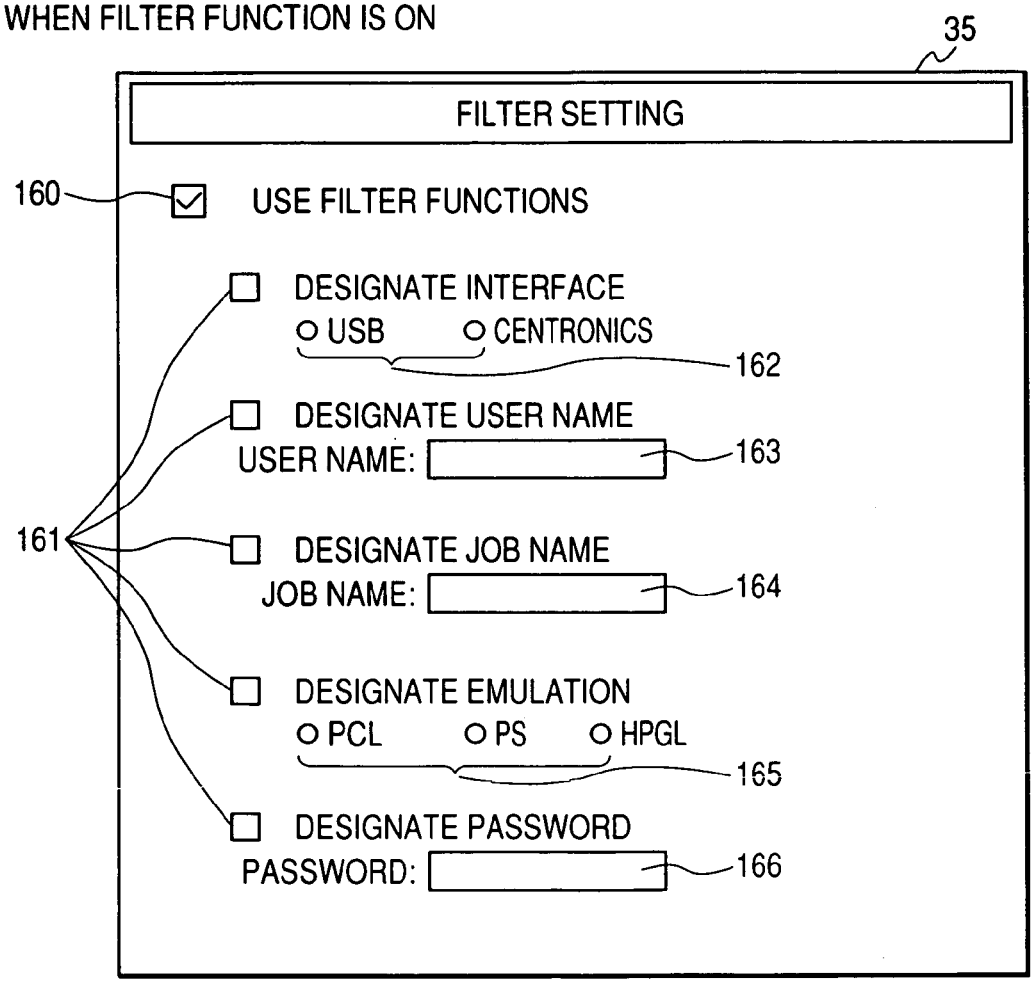
FIG. 11 is a view (before setting the conditions) depicting a first example of a setting screen of conversion permission conditions in a display section of the transmission source apparatus.

In the aspect, a plurality of conversion permission conditions can be set and cancelled based on input information of setting from the operation portion (consisting of a mouse and a keyboard) 36 secured at the transmission source apparatus 4, designating the printing apparatuses individually. FIG. 11 shows a screen for setting conversion permission conditions in the display section 35 of the transmission source apparatus 4. A setting display section (herein, checkbox) 161 that is individually turned on and off by the above-described setting input is displayed, and the display state of the setting display section 161 can be changed over by clicking the mouse so as to identify the set conversion permission conditions and unset conversion permission conditions (Herein, a checkmark is displayed in the checkbox of a set conversion permission condition). Further, auxiliary input sections 162 through 166 are formed in order to input individual conversion permission conditions.

Hereinafter, a further detailed description is given. In the present aspect, the following five conversion permission conditions can be individually set and cancelled; (1) to designate an interface for receiving printing control data from the transmission source apparatus 4, (2) to designate the name of a user, (3) to designate the job name, (4) to designate emulation, and (5) to designate a password. In the printing apparatus 2, execution of command conversion processing by the filter processing program (the printing condition command converting unit) 44 is permitted, where such a status of use is achieved, in which all the conversion permission conditions for which the setting display section 161 is turned on (set) are set as AND conditions.

Hereinafter, a description is given of the conversion permission conditions individually. (1) With the corresponding setting display section 161 turned on, it is determined in advance which one of a plurality of receiving interfaces of printing control data (in FIG. 2, although only one representative interface 28 is depicted, two receiving interfaces which are a serial interface (in detail, USB) and a parallel interface (in detail, centronics) are provided herein) secured in the printing apparatus 2 is made into a conversion permitted interface. Herein, the conversion permitted interface is selected by clicking the setting icon formed in the auxiliary input section 162 by means of a mouse. Only in a case where, as a status of use of the printing apparatus 2, it is detected in which one of a plurality of receiving interfaces the printing control data of a printing job to be executed from now on are inputted, and the receiving interface in which input of the corresponding printing control data detected is made coincident with the conversion permitted interface (USB or centronics), execution of the command conversion processing (control data conversion processing) is permitted.

(2) (5) With the corresponding setting display section 161 turned on, user-specifying information defined in advance are inputted and set in the auxiliary input sections 163 and 166 as the conversion permitted user-specifying information, using the operation section 36 (User-specifying information inputting unit: herein, a keyboard) (Conversion permitted user-specifying information setting unit). Only in a case where the user-specifying information inputted prior to execution of a printing job which becomes a printing target is detected, and the information is made coincident with the conversion permitted user-specifying information set in advance, execution of the command conversion processing (control data conversion processing) is permitted. In (2), the conversion permitted user-specifying information is a user name, and in (5), the conversion permitted user-specifying information is a password.

(3) With the corresponding setting display section 161 turned on, a specified printing job of the printing jobs using the printing control data is inputted and set in the auxiliary inputting portion 164 as a conversion permitted job, using the operation section 36 (user-specifying information inputting unit: herein, a keyboard) (Conversion permitted job setting unit). Only in a case where the set job name of the job names inputted prior to execution of the printing job that becomes a printing target is made coincident with the set conversion permitted job, execution of the command conversion processing (control data conversion processing) is permitted.

(4) With the corresponding setting display section 161 turned on, a specified emulation mode of the emulation modes that the printing apparatus 2 executes printing processing is set as a conversion permitted emulation mode, using the operation section 36 (user-specifying information inputting unit: herein, a keyboard). Herein, the conversion permitted emulation mode is selected by clicking the set icon formed in the auxiliary input section 165 by means of a mouse. It is detected, as the status of use of the printing apparatus 2, how the emulation mode the emulation mode of a printing job to be executed from now on is. Only in a case where the corresponding detected emulation mode is made coincident with the conversion permitted emulation mode, execution of the command conversion processing (control data conversion processing) is permitted.

In addition, in FIG. 11, it is possible to execute a conversion inhibition setting to inhibit control data conversion processing (conversion inhibition setting unit) regardless of the status of use of the printing apparatus 2. The conversion inhibition can be set or cancelled based on the set input information from the operation section (consisting of a mouse and a keyboard) secured at the transmission source apparatus 4 while designating a printing apparatus individually. As shown in FIG. 11, a setting display section (herein, a checkbox) 160 for setting conversion inhibition, which is individually turned on and off by the setting input, is displayed in the display section 35 of the transmission source apparatus 4. Where the set display status of the corresponding setting display section 160 is turned off, execution of control data conversion processing is entirely inhibited regardless of whether either of the plurality of conversion permission conditions is permitted.

Figure 12:
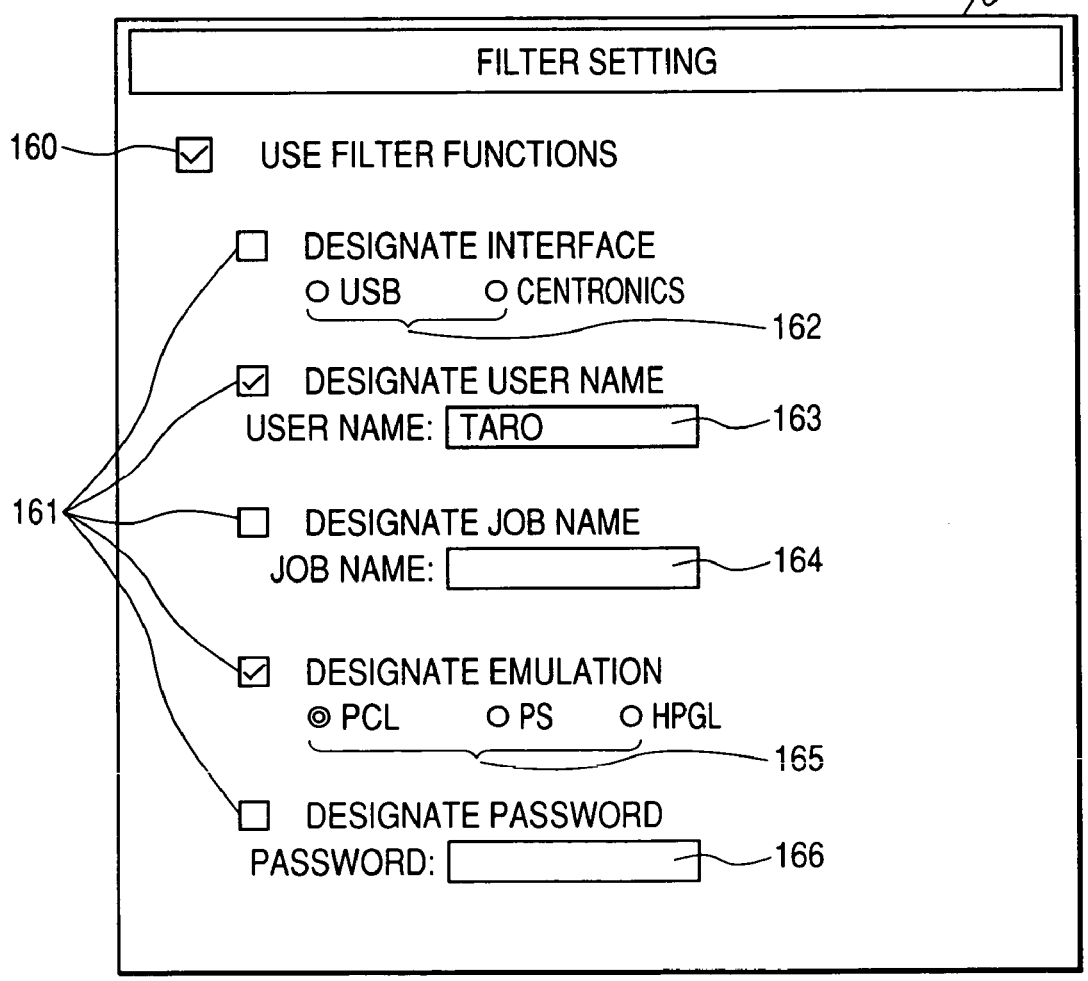
FIG. 12 is a view (after setting the conditions) depicting the first example of a setting screen of conversion permission conditions in the display section of the transmission source apparatus.

FIG. 12 depicts a status of output of the setting screen of the display section 35, in which some of a plurality of conversion permission conditions are combined and set. Herein, control data conversion processing is executed where a specified user name ([TARO]) and a specified emulation mode (PCL) are designated when commencing a printing job. Also, where execution of the control data conversion processing is permitted, processing related to printing is performed based on the secondary printing control data 50 (FIG. 2) obtained by the corresponding control data conversion processing. However, where the control data conversion processing is not permitted, processing related to printing is performed based on the primary printing control data 48.

Figure 13:
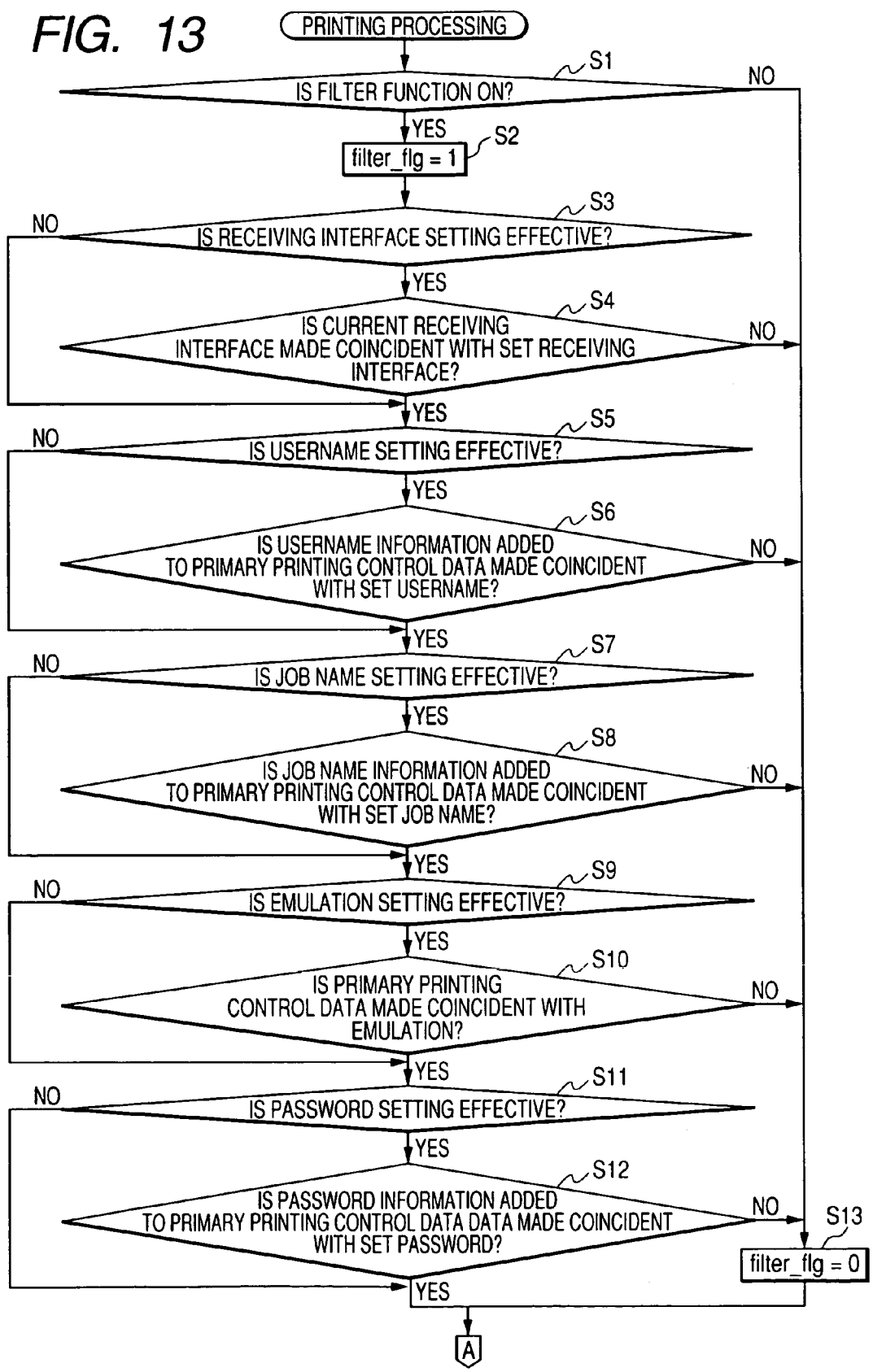
FIG. 13 is a flowchart depicting a first example of printing processing in the printing system.
Figure 14:
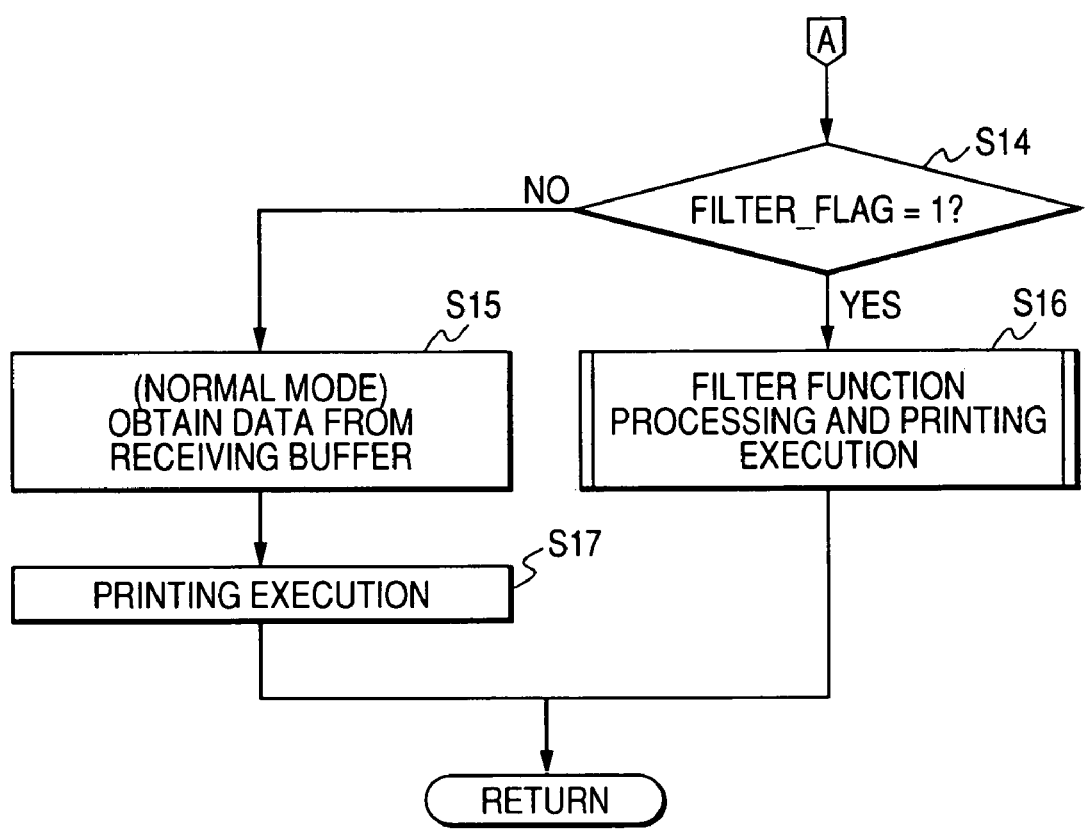
FIG. 14 is a flowchart continued from FIG. 13.
Figure 15:
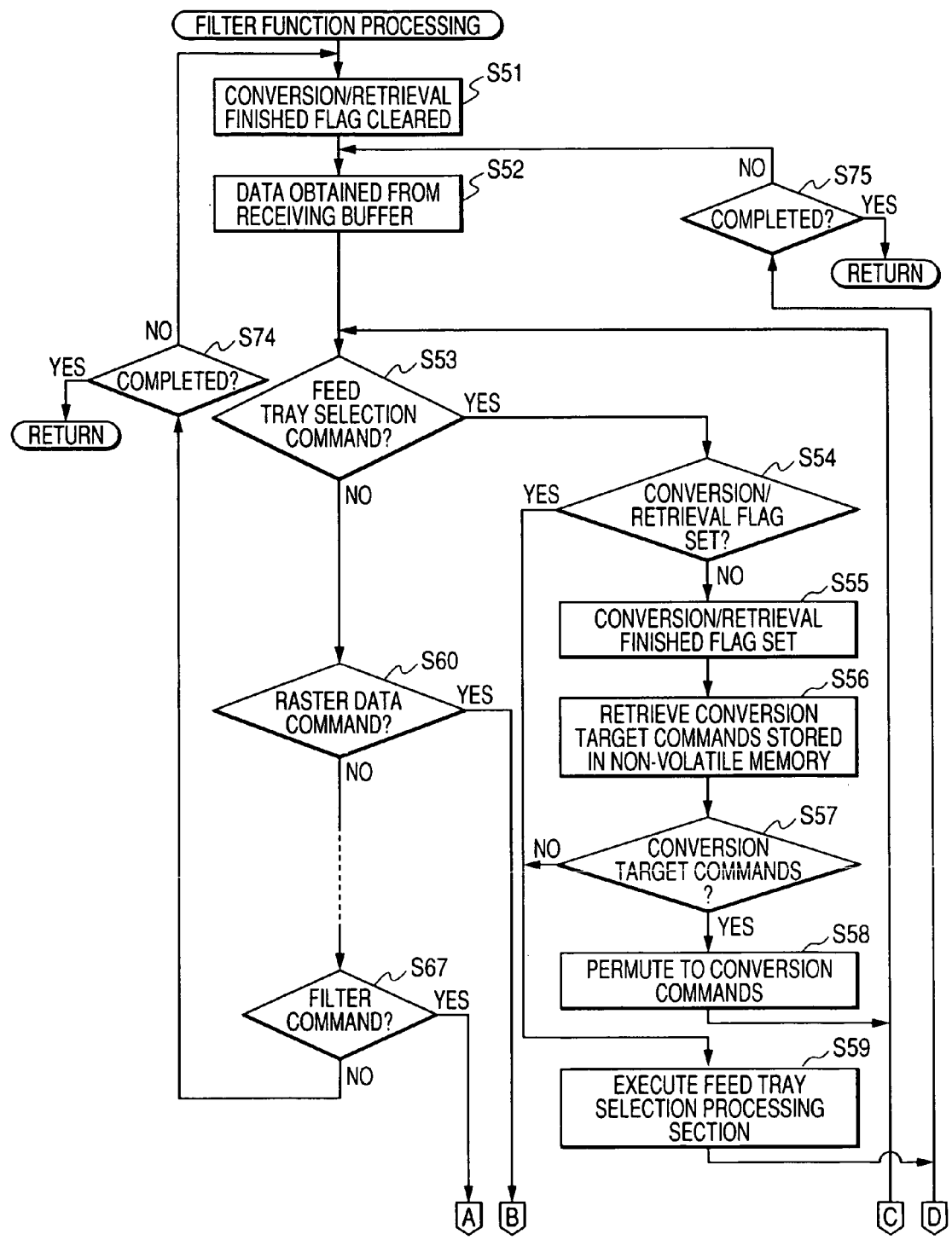
FIG. 15 is a flowchart depicting a filter function processing.

FIG. 13 through FIG. 15 are flowcharts illustrating one example of the processing related to printing in this case. In S1 of FIG. 13, it is determined whether or not the conversion inhibition is set (that is, whether or not the control data conversion processing (filter function) is turned on: the set display status of the setting display section 160 is ON), wherein if YES, the process is advanced to S2, wherein the filter flag (which is formed in the RAM 23 forming a work area of the filter processing program 44 in FIG. 2) is set to "1" (conversion permitted). On the other hand, if NO, the process is advanced to S13, wherein the filter flag is set to "0" (conversion inhibited). In S3, S5, S7, S9, and S11, it is determined whether or not the individual conversion permission conditions are turned into the set statuses (the corresponding set display statuses of the setting display section 161 are turned on). For those which are turned into the set statuses, it is determined whether or not the above-described individual conversion permission conditions are sufficient (S4, S6, S8, S10 and S12). If even one conversion permission condition is sufficient, the process is advanced to S13, wherein the filter flag is set to "0" (conversion inhibited). On the other hand, if all the set conversion permission conditions are sufficient, the filter flag of S2 is maintained at "1" as it is (that is, conversion permitted). In addition, with respect to the conversion permission conditions not set, sufficiency determining steps (S4, S6, S8, S10, and S12) of subsequent conversion permission conditions are skipped in S3, S5, S7, S9 and S11.

Figure 16:
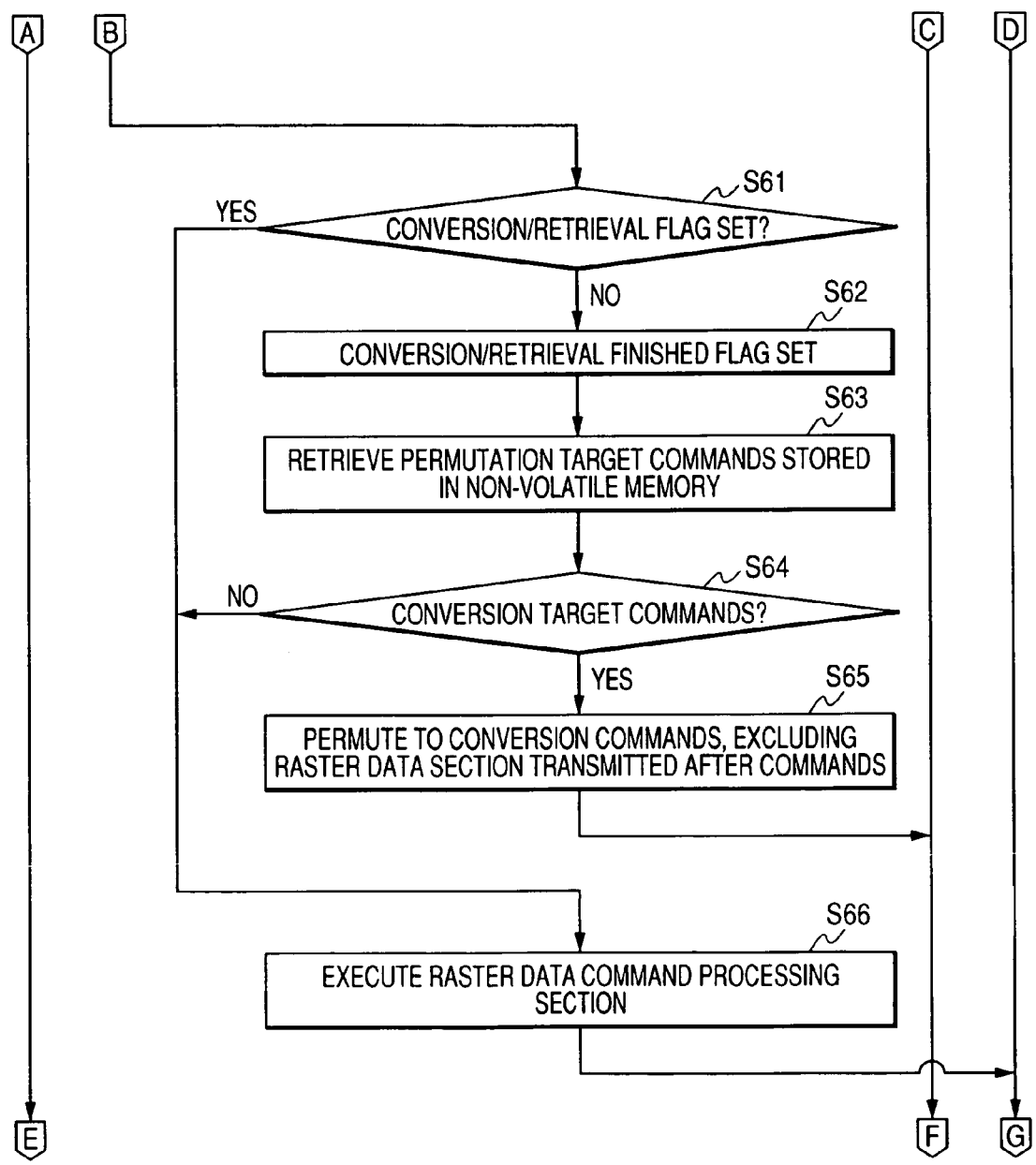
FIG. 16 is a flowchart continued from FIG. 15.
Figure 17:
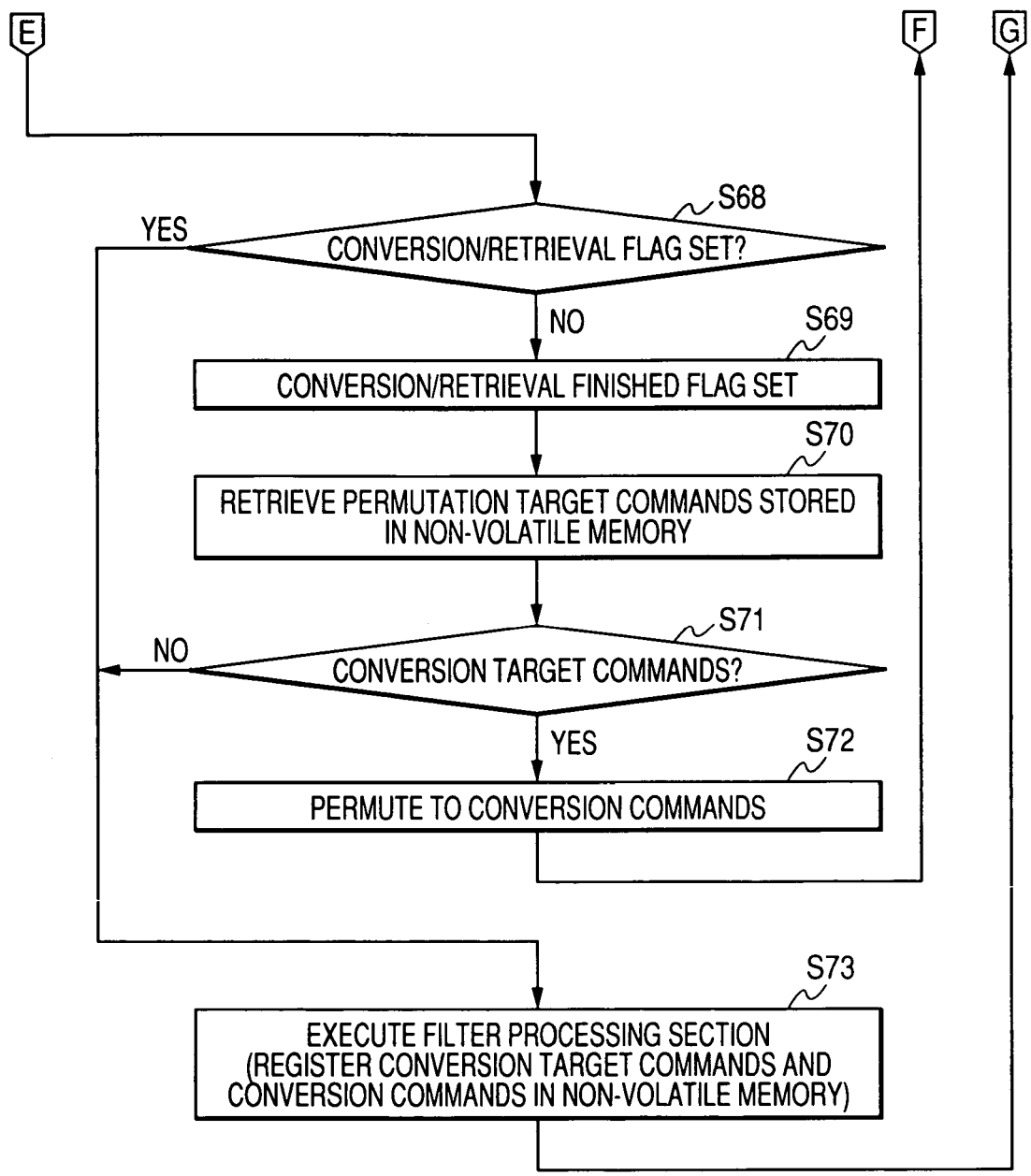
FIG. 17 is a flowchart continued from FIG. 16.

Next, the process is advanced to S14 in FIG. 14, wherein the contents of the filter flag is checked. If the filter flag is "1", the process is advanced to S16, wherein control data conversion processing (filter function processing) and printing are executed. FIG. 15 through FIG. 17 illustrate one example of the filter function processing. In the processing flow, all the primary printing condition commands included in the primary printing control data are made into command conversion processing targets. The conversion restricted commands are subjected to command conversion processing by the above-described method after the conversion processing non-permitted data strings are removed. Since the command conversion processing and command execution processing for execution of printing are performed in separate cycles, a conversion and retrieval finished flag is formed in the RAM 24 of FIG. 2 in order to identify whether or not the command conversion processing (retrieval and conversion) is finished for individual primary printing condition commands. The conversion and retrieval finished flag is cleared (initialized) in S51, and the primary printing control data 48 are received via the receiving buffer 29 in S52.

In S53, S60 and S67, it is identified which type of the commands (conversion target command/conversion restricted command) the sequentially read primary printing condition command is. Then, the process is advanced to command conversion processing (S54 through S59 (FIG. 15), S61 through S66 (FIG. 16) and S68 through S72 and S73 (FIG. 17)) responsive to the type. In any one of the command conversion processing, first, the corresponding conversion and retrieval finished flag is checked (S54, S61 and S68). If the contents of the corresponding flag are not set to the conversion/retrieval finished status (flag is set to "1") (that is, set to "0"), the flag is set to "1" (S55, S62 and S69).

In Steps (S56 and S57, S63 and S64, and S70 and S71) to check whether or not the corresponding primary printing condition command is a conversion target command, first, the conversion target command is retrieved in the conversion restricted command registration section 40 (FIG. 2). If the commands are not the conversion restricted target commands, the conversion target command 148 included in the primary printing control data 48 is retrieved with reference to the contents of the conversion target command registration section 41 formed in the EEPROM (non-volatile memory) 24 of FIG. 2. And, processing to convert to the corresponding conversion command 150 (permutation or addition: the detail is as per description using FIG. 3 through FIG. 10) is performed with reference to the contents of the conversion command registration section 42 to obtain the secondary printing condition command (S58, S65 and S72). In addition, in S65, in order to prevent the raster data from being unnecessarily converted, after the raster data are once saved, the raster data are again added after the converting processing is performed, thereby obtaining the secondary printing condition command.

After that, returning immediately before S53, the same routine is repeated. However, since the conversion and retrieval finished flag is already set (S54, S61, and S68: YES), printing is executed by the secondary printing condition commands after respective conversions, or registering processing of the conversion target commands, conversion commands and conversion restricted commands are executed (S59, S66, S72). Further, in S14 of FIG. 14, if the filter flag is "0," the process is advanced to S15, wherein the received primary printing control data 48 are obtained from the receiving buffer without being converted, and are subjected to printing (or processing in compliance with commands) in S17.

Figure 18:
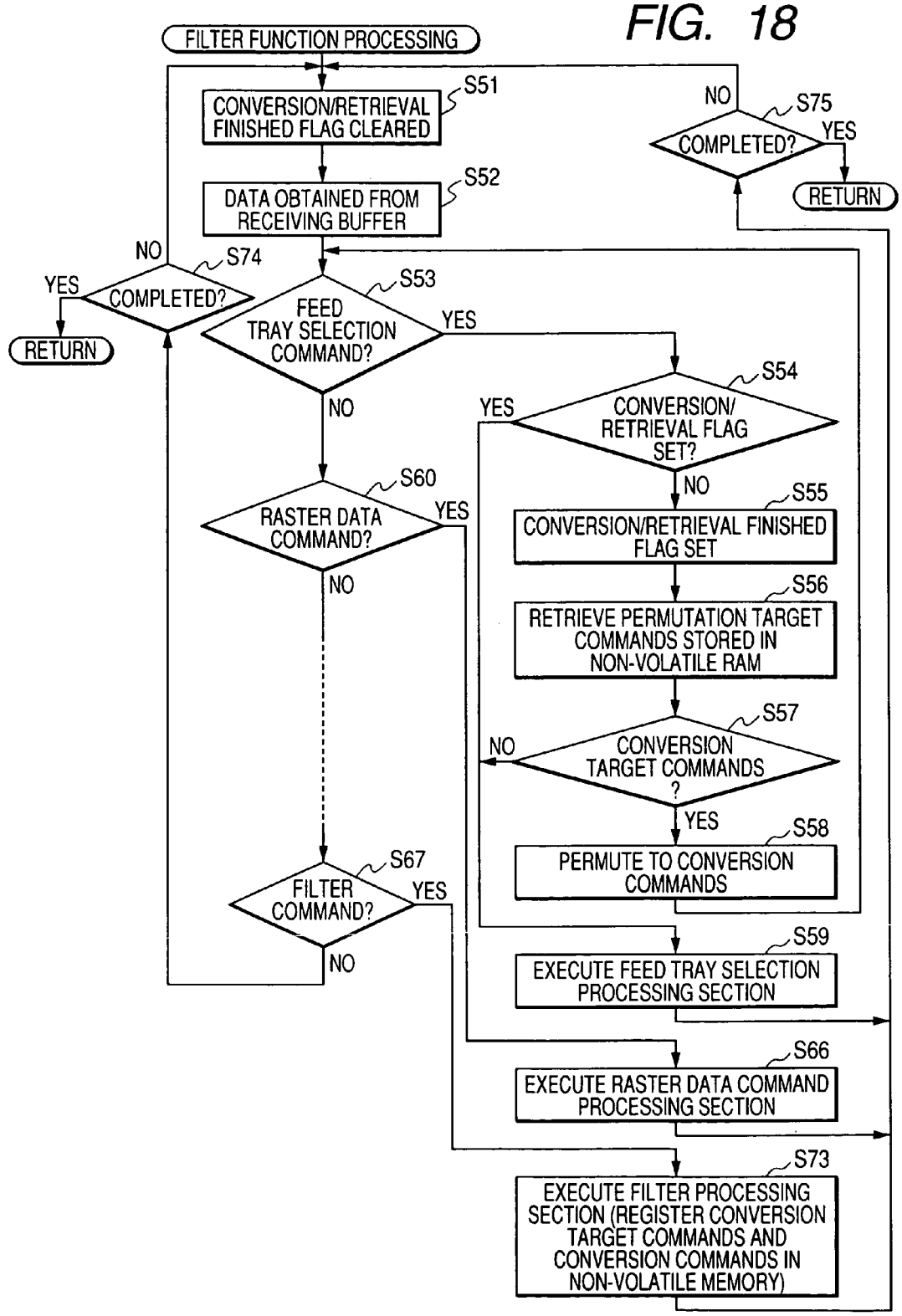
FIG. 18 is a flowchart depicting a modified example of the filter function processing.

In the filter function processing of FIG. 15 through FIG. 17, although the command conversion processing is performed for the conversion restricted commands (raster data commands and filter commands), as depicted in FIG. 18, as regards the conversion restricted commands, the command conversion processing may be skipped (that is, the primary printing condition commands remain unchanged), and the process may be immediately advanced to the command execution processing (S60→S66, S67→S73).

Figure 19:
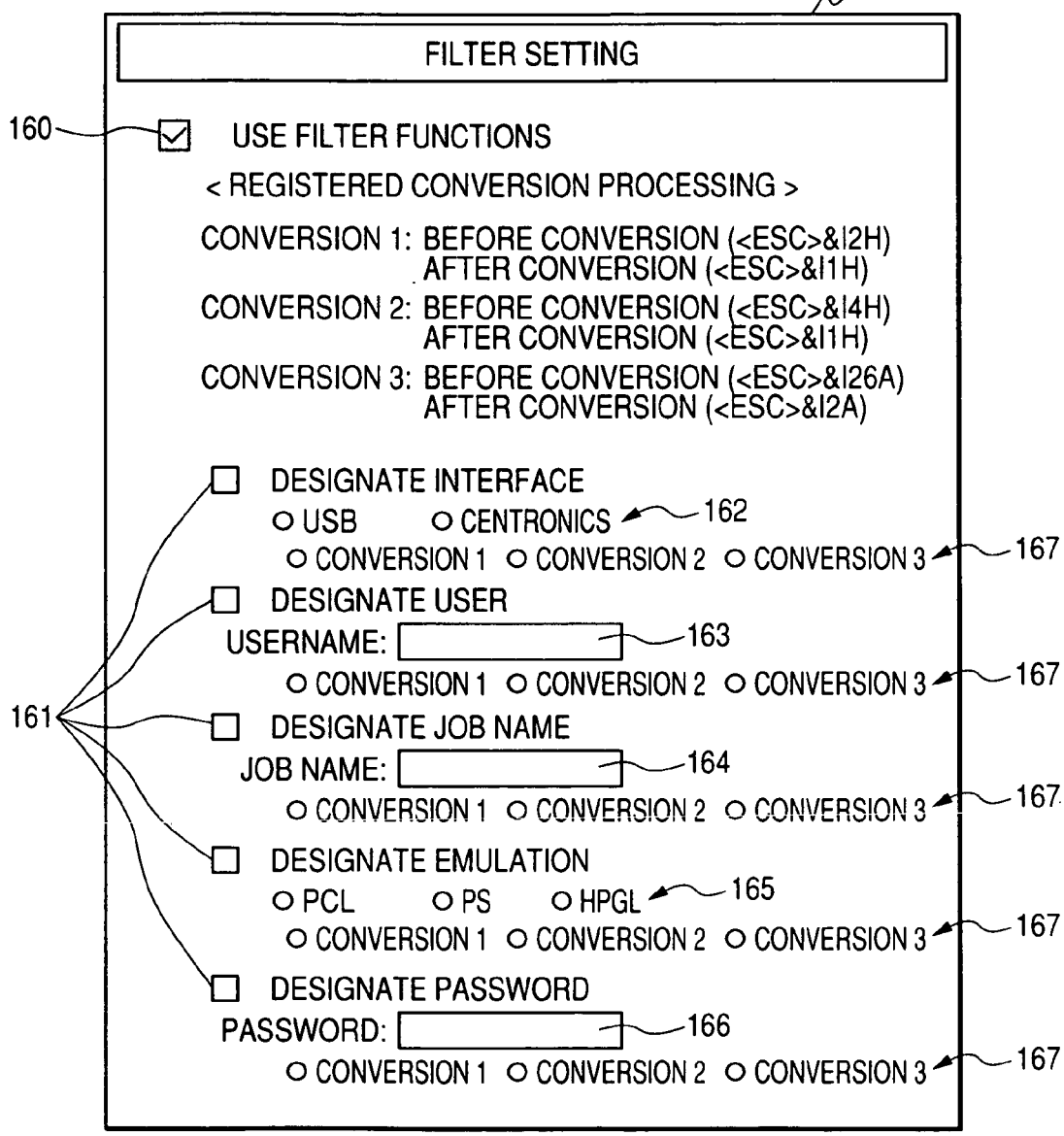
FIG. 19 is a view (before setting the conditions) depicting a second example of a setting screen of conversion permission conditions in the display section of the transmission source apparatus.
Figure 20:
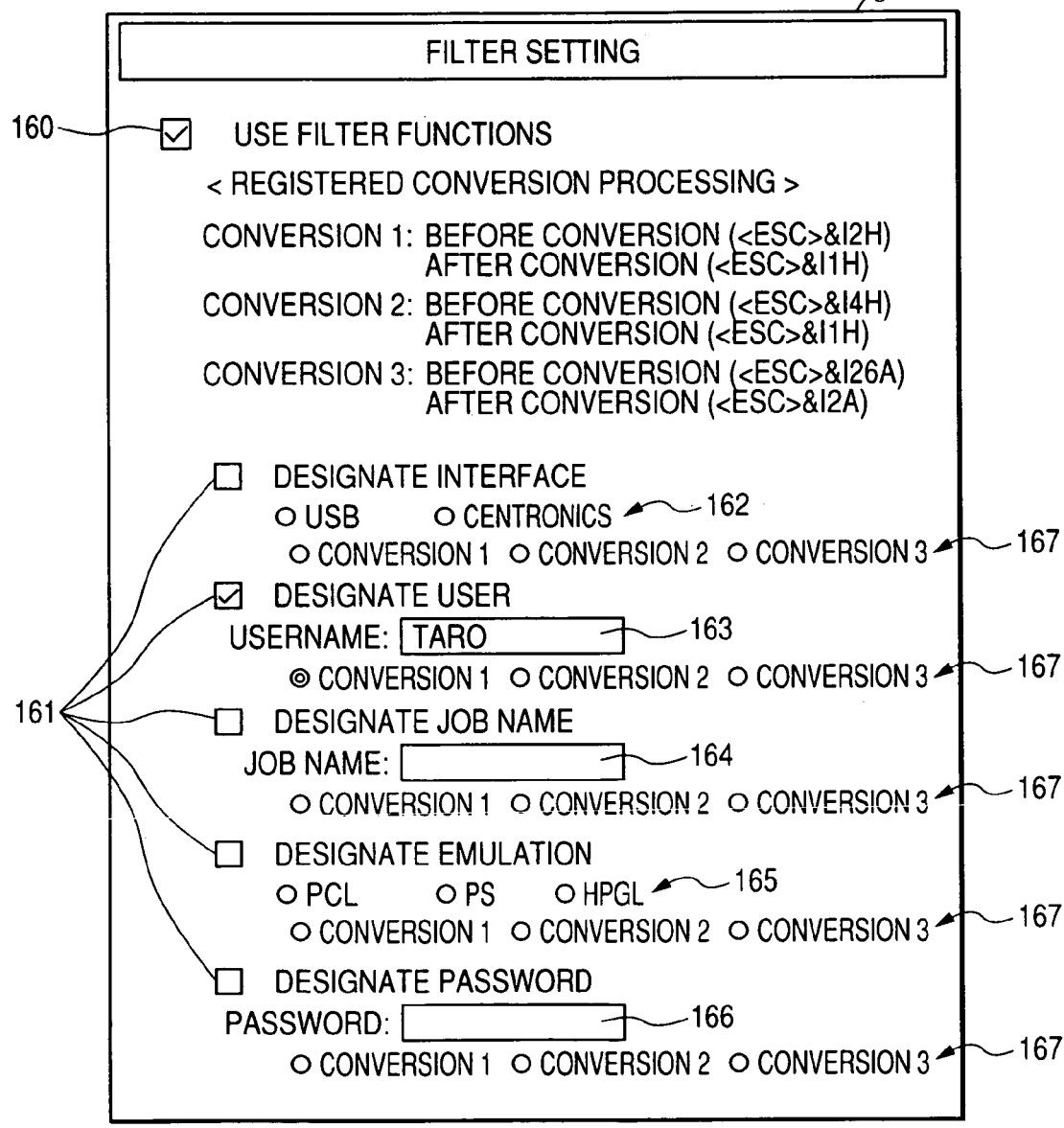
FIG. 20 is a view (after setting the conditions) depicting a second example of a setting screen of conversion permission conditions in the display section of the transmission source apparatus.

In addition, as depicted in FIG. 19, a plurality of sets of contents of control data conversion processing for the primary printing control data 48 corresponding to each of the plurality of conversion permission conditions are defined, and it is possible to customize the contents of the control data conversion processing for each of the conversion permission conditions based on input from the operation section 36. FIG. 19 shows a setting screen of the conversion permission conditions in the display section 35 of the transmission source apparatus 4 in this case. The basic configuration is the same as the setting screen of FIG. 11 (Common parts are given the common numerals, and a detailed description thereof is omitted). Conversion contents selection icon groups 167 operating as the conversion contents selecting unit are formed for each of the conversion permission conditions, wherein it is possible to select any one thereof by clicking by means of a mouse. Herein, three types of selectable contents of conversion are prepared commonly for the conversion permission conditions: Conversion 1: Sheet feeding tray 2 is converted to sheet feeding tray 1, Conversion 2: Sheet feeding tray 4 is converted to Sheet feeding tray 1, Conversion 3: Printing sheet size A4 is converted to Printing sheet size LETTER. The conversion target command registration section and conversion command registration section are individually prepared so as to correspond to each of the conversion contents. FIG. 20 shows one example of the setting status, selection of the conversion contents is permitted in only a conversion permission condition (checkbox 161 is turned on: only one of a plurality of conversion permission conditions can be selectively set) which is in the set status.

Figure 21:
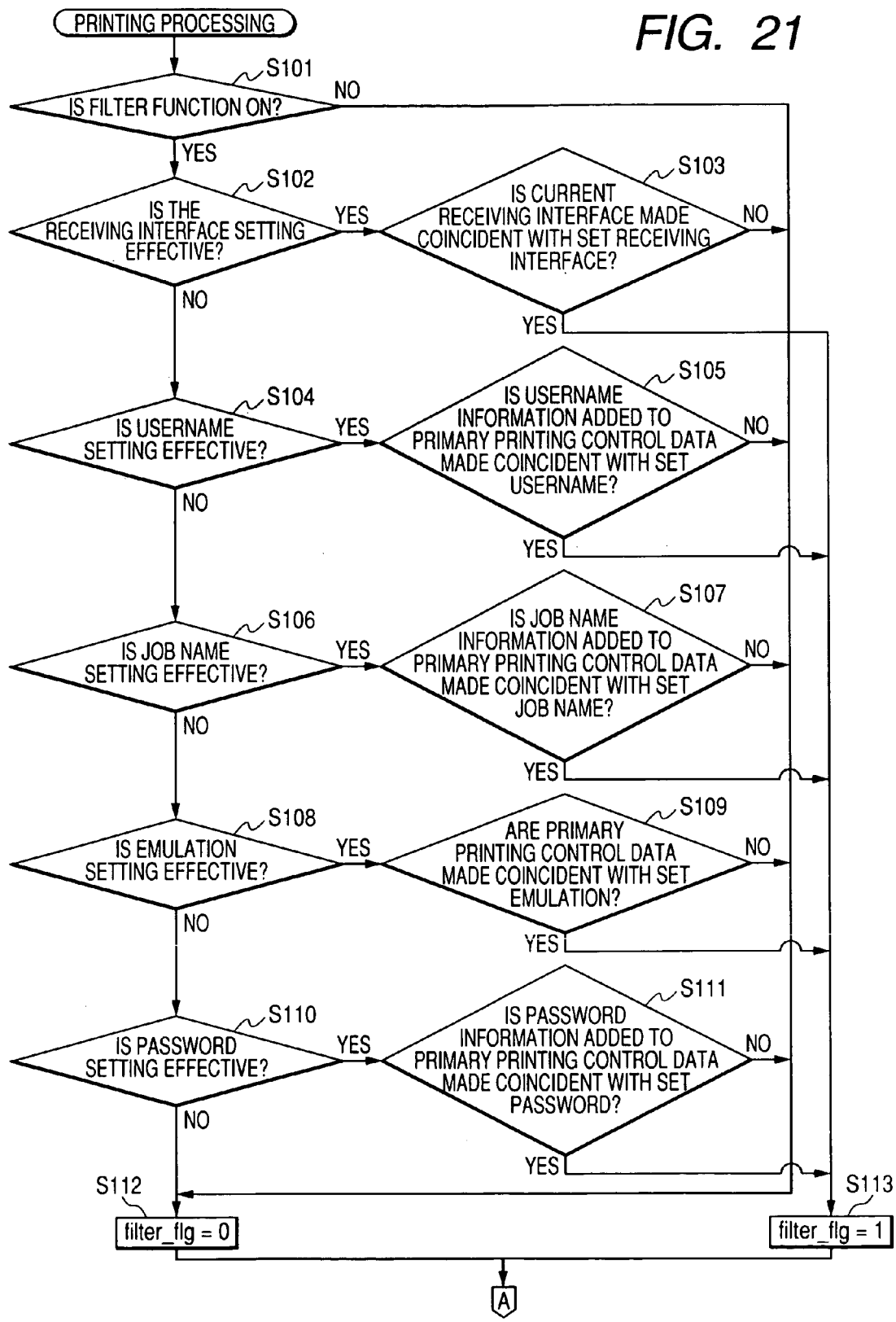
FIG. 21 is a flowchart (the first half portion and the last half portion are identical to FIG. 14) depicting a second example of printing processing in the printing system.
Figure 22:
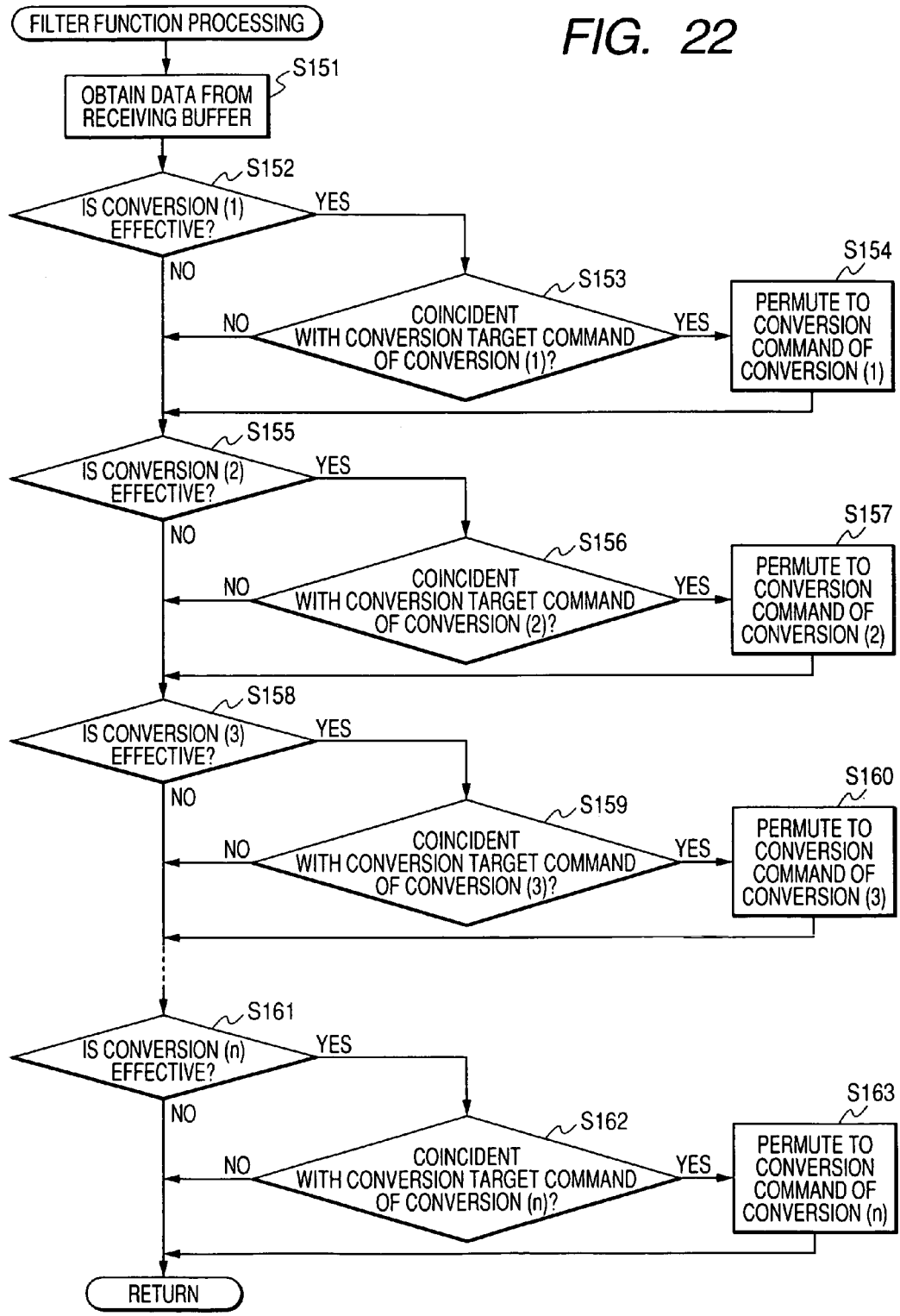
FIG. 22 is a flowchart depicting a flow of the filter function processing corresponding to FIG. 18.

FIG. 21 and FIG. 22 are flowcharts illustrating one example of processing related to printing in this case. In S101 of FIG. 21, it is determined whether or not conversion inhibition is set. If NO, the process is advanced to S112, and the filter flag is set to "0" (Conversion inhibited). On the other hand, if YES, the process is advanced to processes including and after S102. In S102, S104, S106, S108, and S110, it is determined whether or not the individual conversion permission conditions are in the set status. For those which are in the set status, it is determined whether or not the above-described individual conversion permission conditions are sufficient (S103, S105, S107, S109 and S111). If neither of the conversion permission conditions is sufficient, the process is advanced to S112, and the filter flag is set to "0" (Conversion inhibited). On the other hand, only in a case where any one thereof is sufficient, the process is advanced to S113, wherein the filter flag is set to "1" (Conversion permitted).

The following steps are identical to those in FIG. 14. However, in the filter function processing in S16, selection execution processing of conversion contents candidates will be added as in FIG. 22. That is, the primary printing control data 48 are received via the receiving buffer 29 in S151, and in S152, S155, S158, and S161, it is determined which one of a plurality of conversion contents candidates is selected. And, with respect to the selected conversion contents candidates, the conversion target command is retrieved with reference to the corresponding conversion target command registration section (S153, S156, S159, and S162). And, the retrieved and coincident conversion target command is converted to a conversion command with reference to the corresponding conversion command registration section (S154, S157, S160 and S163).

Figure 23:
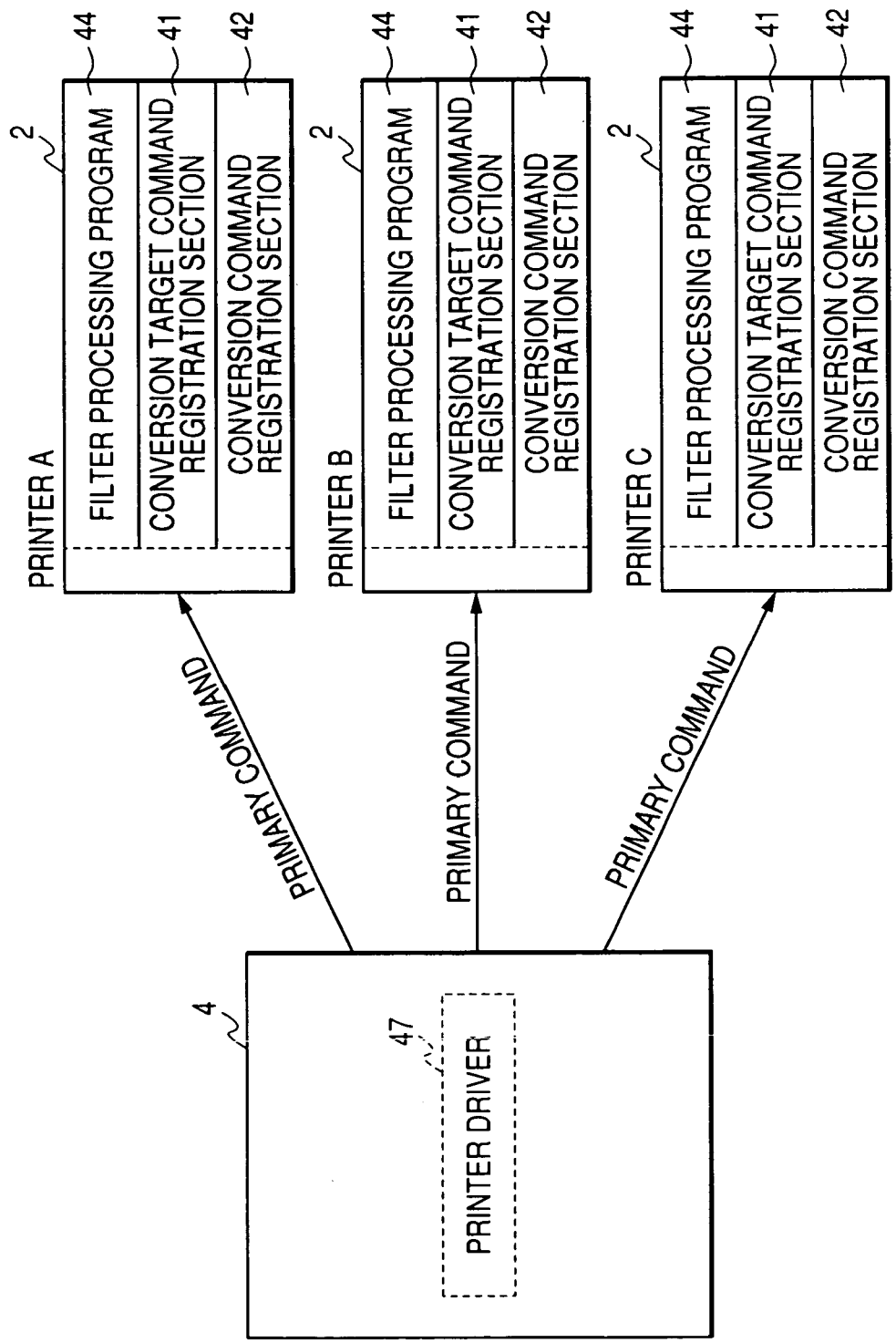
FIG. 23 is a schematic view depicting a first configuration example of the printing system.
Figure 24:
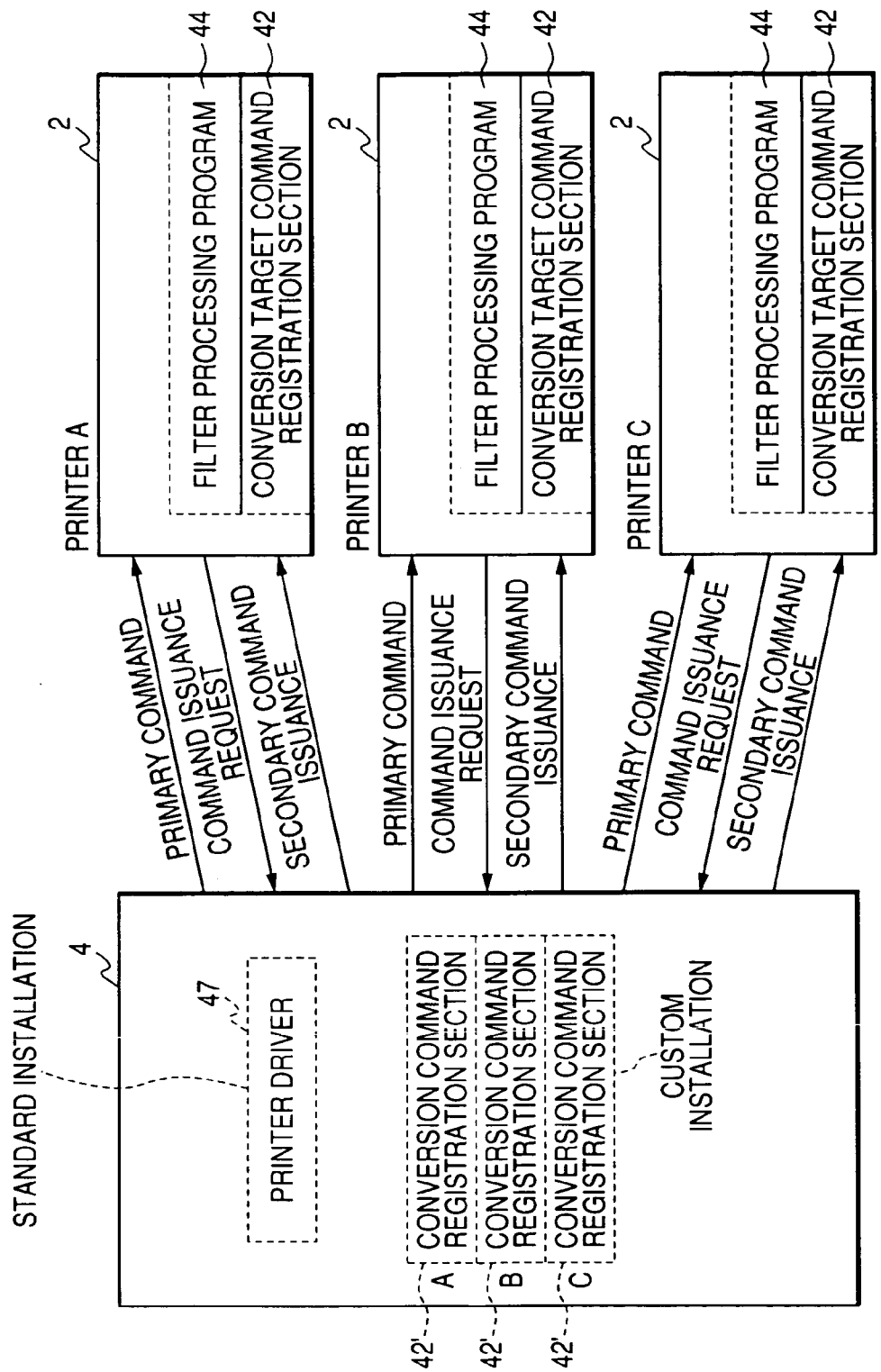
FIG. 24 is a schematic view depicting a second configuration example of the printing system.

In addition, the function of setting and cancelling the conversion permission conditions (and relevant function achieving unit) shown in FIG. 11 through FIG. 13 may be provided at the individual printing apparatuses 2 side. (In this case, in FIG. 2, the setting processing of conversion permission conditions may be executed as well, using the operation section 26 and the display section 25). Or, a web server function to provide setting pages capable of receiving setting inputs in regard to the function of setting and canceling the conversion permission conditions is secured in the printing apparatus 2, and the setting input may be received from a web browser equipped in the transmission source apparatus 4. In addition, in the aspect described above, as depicted in FIG. 23, all of the filter processing program 44, conversion target command registration section 41 and conversion command registration section 42 are installed at the printing apparatus 2 side, the primary printing condition commands (in the drawing, merely referred to as primary commands) from the transmission source apparatus 4 are received by the printing apparatus 2 side, and are converted to secondary printing condition commands (in the drawing, merely referred to as secondary commands) and are supplied for printing. However, as depicted in FIG. 24, conversion command registration sections 42' for each of the printing apparatuses are customized and installed together with the printer driver 47 (for example, the CD-ROM driver 38 of FIG. 2 may be used), and only the conversion target command registration section 41 may be provided at the printing apparatus 2 side. In this case, the respective printing apparatuses 2 perform only retrieval of the conversion target commands by the primary printing control data received from the transmission source apparatus 4, and request issuance of the secondary printing condition commands whenever a conversion target command is found. At the transmission source apparatus 4, a conversion command corresponding to the conversion target command found at the printing apparatuses 2 side is retrieved at the conversion command registration section 42' of the corresponding printing apparatus, and the corresponding command is issued (transmitted) to the printing apparatus 2 side as the secondary printing condition command.

Figure 25:
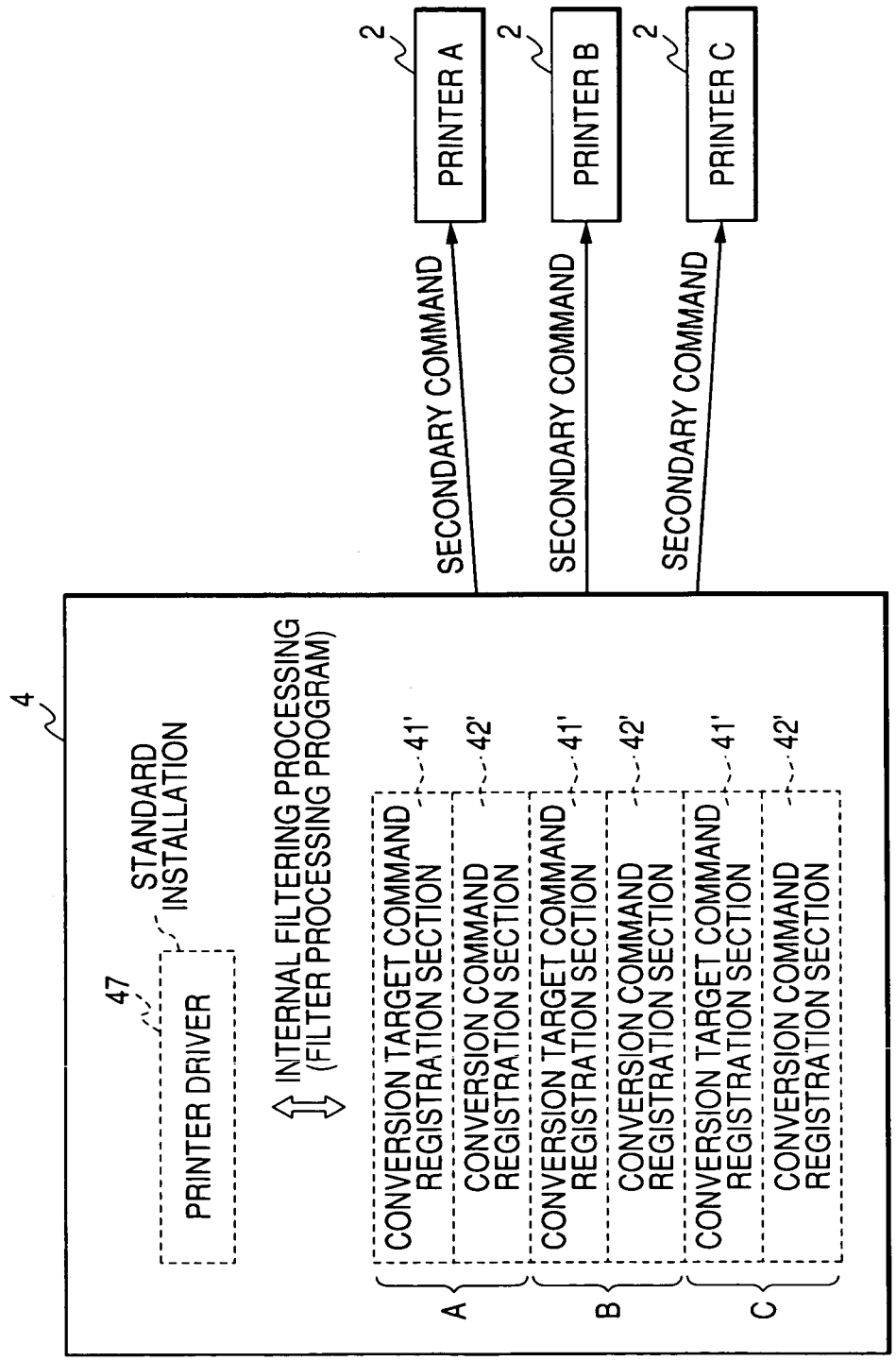
FIG. 25 is a schematic view depicting a third configuration example of the printing system.

Further, as depicted in FIG. 25, the conversion target command registration section 41' and the conversion command registration section 42', which are provided for each of the printing apparatuses, may be customized and installed in the transmission source apparatus 4 along with the printer driver 47 and the filter processing program 44. In this case, with reference to the conversion target command registration section 41' corresponding to the printing apparatus 2 that becomes a transmission destination, conversion target commands are retrieved in the primary printing control data at the transmission source apparatus 4 side, wherein if any conversion target command is found, it is converted to a conversion command with reference to the corresponding conversion command registration section 42', and is transmitted to the corresponding printing apparatus 2 as the secondary printing condition command.

As was described, according to the aspect of the invention, there is provided a printing system having a transmission source apparatus that becomes a transmission source of a printing condition command to specify control conditions of processing related to printing and a printing apparatus for carrying out the processing based on the printing condition command received from the transmission source apparatus, and including: a primary printing condition command storing unit, which is provided in the transmission source apparatus, for storing a primary printing condition command; and a printing condition command converting unit for converting the primary printing condition command read from the primary printing condition command storing unit to a secondary printing condition command corresponding to the printing apparatus, wherein the printing apparatus performs the processing based on the secondary printing condition command.

Further provided is a printing apparatus including a primary printing condition command receiving unit for receiving the primary printing condition command from the transmission source apparatus, a printing condition command converting unit for converting the received primary printing condition to the secondary printing condition command corresponding to the printing apparatus, and a printing processing unit for carrying out the processing based on the secondary printing condition command obtained by the conversion. Further, it is possible to compose the printing system employing a printing apparatus according to the invention. In this case, the printing system is composed so that the printing apparatus is provided with a primary printing condition command receiving unit for receiving the primary printing condition command from a transmission source apparatus and a printing condition command converting unit for converting the corresponding received primary printing condition command to the secondary printing condition command.

According to the printing system and printing apparatus, a printing condition command specialized in printing conditions requested at the printing apparatus side are not held for respective printing conditions individually, but primary printing condition commands provided at the transmission source apparatus are converted, by the printing condition command converting unit, to the secondary printing condition command showing control conditions corresponding to printing apparatuses, and are subjected to the processing related to printing. Therefore, a user is relieved from cumbersome work of inputting printing condition command one by one to cope with printing control conditions specific to the respective printing apparatuses, and the secondary printing condition command to cope with various printing conditions are prepared by conversion from the primary printing condition command and are used. Therefore, it is possible to secure a sufficient degree of freedom to change the printing conditions without excessively enlarging the printing control data to be prepared by the transmission source apparatus.

Since the printing apparatus comprises the printing condition command converting unit for converting the received primary printing condition command to the secondary printing condition command corresponding to the printing apparatuses, a function of preparing the secondary printing condition command corresponding to the printing apparatuses is equipped as an internal processing function of the printing apparatuses, wherein it is possible to simplify the system of the printing control data (finally, the printer drivers employing the same data) at the transmission source apparatus side to a large extent. Therefore, it is possible to relieve the processing burden of the transmission source apparatus side, and possible to easily cope with upgrade of the version.

In particular, where a plurality of printing apparatuses are connected to a transmission source apparatus, it is better that a plurality of the primary printing condition command converting units are prepared for the plurality of printing apparatuses. In this case, the printing condition command converting units convert the common primary printing condition command to secondary printing condition command corresponding to respective printing apparatuses one by one. The respective printing apparatuses are capable of carrying out the processing using the command, addressed to each printing apparatus, of the plurality of secondary printing condition commands. With the system, it is not necessary for the transmission source apparatus side to mount individual printing condition commands for a plurality of printing apparatuses having different settings of printing conditions, and the common primary printing condition command can be used among a plurality of printing apparatuses. Therefore, it is possible to reduce the amount of printing condition commands to be incorporated at the transmission source apparatus side. In addition, it becomes unnecessary for a user to set individual printing control conditions for individual printing apparatuses whenever carrying out the processing, wherein it is possible to greatly save trouble and manpower of setting input for printing.

The printing control data may be written as a set of a plurality of printing condition commands. The printing condition command converting unit may convert at least a part of a plurality of primary printing condition commands, which compose the primary printing condition commands, to secondary printing condition commands that are printing condition commands specific to the printing apparatuses. Since printing control data are written as a set of a plurality of printing condition commands, a process for converting the same to the secondary printing condition commands can be performed unit by unit, wherein it is possible to skip conversion for unnecessary commands. Therefore, it is possible to attempt to improve the efficiency of conversion processes. Also, the control contents of the process related to printing can be easily predicted, wherein it becomes easy to find bugs.

In this case, the printing system may be composed so as to comprise: a conversion target command registration unit for registering, in advance, an object to be converted of the primary printing condition commands as a conversion target command; a conversion command registration unit for registering a conversion command, which is an after-conversion printing condition command corresponding to the conversion target command, as the secondary printing condition command; and a conversion target command selecting unit for selecting a conversion target command included in the primary printing condition command with reference to the contents of the conversion target command registration section. The printing condition command converting unit converts the selected conversion target command to the conversion command corresponding thereto.

With this configuration, conversion target commands are selected among the primary printing condition commands with reference to the registration contents of the conversion command registration unit, and furthermore, are converted to conversion commands corresponding thereto, thereby obtaining the secondary printing condition commands. Therefore, a conversion process of the primary printing condition commands to the secondary printing condition command can be remarkably efficiently performed.

The printing condition command converting unit may perform permutation processing of the conversion target commands to conversion commands having the same type specifying data string and different condition specifying data string. With this system, it is sufficient that the conversion process performs permutation processing of the condition specifying data string of the primary printing condition commands (conversion target commands) to the to the secondary printing condition commands (conversion commands), wherein further simplification can be achieved in the conversion process.

In this case, generalized commands in which the condition specifying data strings in the conversion target commands comprising the same type specifying data string are commonly encoded, are registered in the conversion target command registration unit. In this case, representative commands having data values, which express specified instruction condition contents, substituted therein may be registered to the condition specifying data strings, in which generalized commands are commonly encoded, in the conversion command registration unit as conversion commands. And, the conversion target command selecting unit may be composed so that the unit selects the primary printing condition command in which the type specifying data string is made coincident with the generalized command, and the printing condition command converting unit may be composed so that the selected and coincident conversion target commands perform permutation processing by the representative commands. According to the construction, even in a case where the primary printing condition command comprises a number of conversion target commands having different condition specifying data string, it is possible to collectively select and replace (permute) the same types of conversion target commands by preparing generalized commands. This is very efficient. In addition, since it is not necessary to register a number of the same types of conversion target commands, trouble required for registering processes can be saved, and the memory capacity of the conversion command registration unit can be effectively utilized.

Specifically, in the descriptive system of printing condition commands, it is possible to handle a plurality of series of printing condition commands, whose types of printing control target are the same but instruction condition contents differ from each other, as one group. The printing condition commands to form the groups may be described as those including a group specifying section to specify the respective groups and a condition specifying section to specify to which one of a plurality of instruction conditions belonging to the corresponding groups the printing condition command is matched. The command converting unit may perform permutation processing of the conversion target commands to conversion commands whose contents of the group specifying section are the same as those of the corresponding conversion target commands and whose contents of the condition specifying section are different therefrom. By incorporating the group specifying section as described above into the printing condition commands, it is possible to simply and reliably specify the same types of commands to be the target of the permutation processing, by collating the contents of the group specifying section, wherein it is possible to efficiently execute the corresponding permutation processing.

By employing the command structure in which the group specifying section and the condition specifying section are separated from each other, it becomes possible to easily perform common encoding of the above-described condition specifying section. In detail, while, with respect to a plurality of conversion target commands in which the contents of the group specifying section are the same and the contents of the condition specifying section are different from each other, generalized commands are prepared in the form of commonly encoding the condition specifying section, and generalized commands are registered in the conversion target command registration section instead of a plurality of conversion target commands, representative commands in which specified data values are substituted in the condition specifying section are registered in the conversion command registration section as conversion commands. The conversion target command retrieving unit may retrieve those of the conversion target commands included in the primary printing control data, in which the contents of the group specifying section are made coincident with the generalized commands, and the command converting unit may uniquely perform permutation processing of the corresponding retrieved and coincident with conversion target commands by the representative commands.

The group specifying section may specify any one of the sheet feeding tray of a printing apparatus, sheet delivery tray of a printing apparatus, size of printing sheets, type of printing sheets, insertion direction of printing sheets into a printing apparatus, and printing format as a printing control target. Any one of the printing control targets is common in that it is selected from a plurality of candidates and set in compliance with the specification of a printing apparatus. Also, the condition specifying section enables descriptions as parameters (for example, integral parameters: as a detailed example, integral parameters designating the sheet feeding trays and sheet delivery trays using numerals) corresponding to these candidates one by one. In this case, the command permutation processing is made simple, that is, a parameter value designated in a command during commanding the primary printing conditions is converted to a required parameter value.

Also, the command converting process is not limited to such a command permutation processing as described above. For example, with respect to the conversion target commands, the command converting unit may be composed so as to additionally process the printing condition commands of a different type from the corresponding conversion target commands. For example, where a conversion target command in the primary printing condition commands merely regulates the type of the sheet feeding tray of the printing apparatus, the printing condition command added in the above-described additional process may specify the type of the printing sheets. As has been made clear in this example, although the primary printing control data regulate the upper-ranked printing conditions having a wide spread in the conditional specifications, it becomes possible to control printing in restricted (or complicated) specifications, in which the printing purpose is further specified, through addition of a new command by carrying out a command converting process as an additional process of the printing condition commands of a different type. In addition, trouble in which printing is not performed as per request due to omission in setting the conditions hardly occurs.

Next, the printing system may comprise: a conversion permission condition setting unit for setting predetermined conversion permission conditions that the use status of the printing apparatus satisfy; a conversion permitted determining unit for detecting the use status of the printing apparatus and determining whether or not the corresponding use status thus detected satisfies the set conversion permission conditions; and a conversion permitting unit for permitting execution of the conversion process to the printing condition command converting unit where it is determined by the conversion permitted determining unit that the conversion permission conditions are sufficient to convert the primary printing condition command into the secondary printing condition command.

Since the primary printing condition commands are usually prepared to be functioned as general printing control conditions, it is considered that the primary printing condition commands may be used without any particular conversion at the printing apparatus side if the primary control conditions match the user's requirements. That is, all of the primary printing condition commands are not necessarily converted to the secondary printing condition commands at all times. However, it is cumbersome that, at any time when printing is performed, a user determines which primary printing condition commands are made into targets converted to the secondary printing condition commands, and gives an instruction on whether or not the conversion is executed. In the above-described construction, it is determined in advance by the conversion permission condition setting unit whether or not conversion to the secondary printing condition commands is performed in compliance with what state of use the printing apparatus is, thereafter, the state of use of the printing apparatus is detected at each time when printing is performed, and it is determined whether the corresponding detected state of use satisfies the set conversion permission conditions, and when it is determined that the corresponding conversion permission conditions are sufficient, conversion to the predetermined secondary printing condition commands is permitted. Accordingly, the user is relieved from cumbersome work by which the user determines whether or not the primary printing condition commands are to be converted to secondary printing condition commands, pertaining to a current printing process.

In this case, it is possible to define a plurality of sets of contents of the conversion process for the corresponding primary printing condition command in regard to respective conversion permission conditions set by the conversion permission condition setting unit. Further, a conversion contents selecting unit for selecting any one of the corresponding plurality of sets of conversion process is provided, and at the same time, the printing condition command converting unit may be constructed so that the primary printing condition commands are converted to the secondary printing condition commands in compliance with the selected conversion process. By preparing a plurality of selection candidates of conversion contents for respective conversion permission conditions, selecting and using one candidate thereof requested by a user, it is possible to increase the degree of freedom for setting the conversion contents of the primary printing condition commands, and further, the printing control conditions obtained as a result of conversion, wherein it is possible to further minutely cope with the request of a user. For example, where a plurality of transmission source apparatuses are connected to a single printing apparatus provided with a plurality of sheet delivery trays, status of use of a printing apparatus for which conversion permission conditions are to be determined are defined as the type of a transmission source apparatus from which the primary printing condition command is received, and a selection candidate of the conversion contents for each of the transmission source apparatuses can be defined as the type of a sheet delivery tray to which printed matters are outputted. Therefore, printing control in which one of a plurality of sheet delivery trays is used for the type of the transmission source apparatus can be simply performed.

Hereinafter, a description is given of a further detailed example. The conversion permission condition setting unit comprises conversion permitted interface setting unit for setting which one of a plurality of receiving interfaces of printing control data set in a printing apparatus is made into a conversion permitted interface as one of the conversion permission conditions, and the conversion permitted determining unit may be constructed so that, only in a case where it is detected as a status of use of the printing apparatus to which one of a plurality of receiving interfaces the printing control data are inputted, and the receiving interface in which input of the corresponding printing control data is detected is made coincident with a conversion permitted interface, the conversion permitted determining unit gives the printing condition command converting unit permission to execute a conversion process. According to this system, it is possible to automatically determine, based on the type of the receiving interface of the printing apparatus, whether or not a control data converting processing is performed. For example, in a case of a printing apparatus equipped with two communications interfaces which are a serial communications interface and a parallel communications interface, by connecting transmission source apparatuses to both of the communications interfaces, a plurality of transmission source apparatuses can share the corresponding printing apparatus. And, if any one of the two communications interfaces is made into a conversion permitted interface, only the primary printing control data from the transmission source apparatus connected to the corresponding conversion permitted interface side are automatically converted to control data.

Further, a user-specifying information acquiring unit for acquiring user-specifying information of a printing apparatus is provided. The conversion permission condition setting unit comprises a conversion permitted user-specifying information setting unit for setting one of the user-specifying information as specific information of conversion permission user as one of the conversion permission conditions, and the conversion permitted determining unit may be constructed so as to permit the printing condition command converting unit to execute a conversion process in a case where user-specifying information acquired in the user-specifying information acquiring unit is detected, and the corresponding user-specifying information is made coincident with the set conversion permitted user-specifying information. Thus, only where user-specifying information pertaining to a specified user is inputted, it is possible to execute the conversion process, wherein the printing control data can be converted by a condition specific to a user (that is, a condition requested by only a specified user). Also, the user-specifying information may be a user name (user ID) or may be a password specific to the user.

In addition, the conversion permission condition setting unit comprises conversion permitted job setting unit for setting, as a conversion permitted job, a specified printing job of printing jobs, and the conversion permitted determining unit may be constructed so as to permit the printing condition command converting unit to execute a control data converting processing only in a case where it acquires a printing job-specifying information, which the corresponding printing apparatus receives, as a status of use of the printing apparatus, and the corresponding printing job is made coincident with the set conversion permitted job. Thus, it is possible to execute a conversion processing for a specified printing job, and for example, conversion of the printing control data can be performed under a condition specific to the corresponding printing job.

Also, the conversion permission condition setting unit comprises a conversion permitted emulation mode setting unit for setting a specified emulation mode of the emulation modes, which a printing apparatus performs printing processing, as a conversion permitted emulation mode as one of the conversion permission conditions. The conversion permitted determining unit may be constructed so that it acquires, as a status of use, an emulation mode which the corresponding printing apparatus uses for execution of printing processing, and permits the printing condition command converting unit to execute a conversion process in a case where the corresponding emulation mode is made coincident with the set conversion permitted emulation mode. Thus, it is possible to execute a control data converting processing only in a case where a specified emulation mode is designated.

The above-described conversion permission conditions may be used for determination of conversion permission in the form in which a plurality of permit conditions are combined. In this case, the conversion permitted determining unit may be constructed so as to permit the printing condition command converting unit to execute a conversion process in a case where a plurality of predetermined conversion permission conditions are simultaneously sufficient. Thus, where further restricted conversion permission conditions are requested, it is possible to simply and minutely cope with such a request by combination of a plurality of conversion permission conditions.

In addition, it is possible to provide a conversion inhibition setting unit for inhibiting execution of the conversion process regardless of a status of use of a printing apparatus. Where conversion inhibition is set by the conversion inhibition setting unit, the conversion permitting unit is constructed so as to cause the printing condition command converting unit to inhibit execution of the conversion process regardless of the contents of setting by the conversion permission condition setting unit. By providing the conversion inhibition setting unit, it is possible to unconditionally inhibit the conversion process regardless of the status of use of the printing apparatus. It is possible to prevent inconvenience, by which requested printing results cannot be obtained by unexpected conversion of control data, beforehand where a user does not specially request. In this case, if the conversion permission condition setting unit is constructed so that the setting mode of conversion permission conditions is activated only in a case where the conversion inhibition setting unit does not set any conversion inhibition, this is further effective.

In the series of constructions for setting conversion permission conditions, if a printing apparatus is constructed so that processing related to printing is performed based on secondary printing control data obtained by a conversion process where execution of the conversion process is permitted, and the processing related to printing is performed based on the primary printing control data where execution of the conversion process is not permitted, it is possible to execute the process relate to printing at once, using the primary printing control data as they are, where the conversion process is not permitted.

What is claimed is:

1. A printing system comprising:
   a printing condition command receiving unit that receives a primary printing condition command, the primary condition command being included together with printing image data in printing control data;
   a printing condition command converting unit that converts the primary printing condition command to a secondary printing condition command corresponding to a printing apparatus;
   a printing apparatus that carries out processing related to printing the printing image data based on the secondary printing condition command;
   a conversion permission condition setting unit that sets predetermined conversion permission conditions satisfied by a use status of the printing apparatus;
   a conversion permitted determining unit that detects the use status of the printing apparatus and determines whether or not the corresponding use status thus detected satisfies the redetermined conversion permission establishing conditions; and
   a conversion permitting unit that permits execution of a conversion process to the printing condition command converting unit to convert the primary printing condition commands to the secondary condition commands when it is determined by the conversion permitted determining unit that the conversion permission conditions are sufficient.

2. The printing system according to claim 1, further comprising:
   a transmission source apparatus that transmits the primary printing condition command, the transmission source apparatus comprising a primary printing condition storing unit that stores the primary printing condition command,
   wherein the printing condition command receiving unit receives the primary printing condition command.

3. The printing system according to claim 2, wherein a plurality of the printing apparatuses are connected to the transmission source apparatus,
   a plurality of the printing condition command converting units corresponding to the plurality of the printing apparatuses are prepared, the printing condition command converting units convert the common primary printing condition command to the secondary printing condition commands corresponding to the respective printing apparatuses, and the respective printing apparatuses perform the processing related to printing based on their own printing condition command among the plurality of secondary printing condition commands.

4. The printing system according to claim 2, wherein a plurality of the printing apparatuses are connected to the transmission source apparatus, the transmission source apparatus transmits printing control data as a set of a plurality of the printing condition commands, and the printing condition command converting unit converts at least a part of the plurality of printing condition commands, which compose the printing control data, to the secondary printing condition commands, which are printing condition commands corresponding to the respective printing apparatuses.

5. The printing system according to claim 4, further comprising:

a conversion target command registration unit that registers, in advance, an object to be converted of the primary printing condition commands as a conversion target command;

a conversion command registration unit that registers, in advance, a conversion command, which is an after-conversion printing condition command corresponding to the conversion target command, as the secondary printing condition command; and a conversion target command selecting unit that selects a conversion target command included in the primary printing condition commands with reference to the contents of the conversion target command registration unit, wherein the printing condition command converting unit converts the selected conversion target command to the conversion command corresponding thereto.

6. The printing system according to claim 5, wherein the primary printing condition command comprises a type specifying data string for specifying a type of the primary condition command and a condition specifying data string for specifying a processing condition, and the printing condition command converting unit performs permutation processing of the conversion target command to a conversion command having the same type specifying data string and different condition specifying data string.

7. The printing system according to claim 6, wherein, while generalized commands, in which the condition specifying data strings in the conversion target commands comprising the same type specifying data string are commonly encoded, are registered in the conversion target command registration unit, representative commands in which data values expressing specified instruction condition contents are substituted for the condition specifying data strings of the generalized commands are registered in the conversion command registration unit as the conversion commands, the conversion target command selecting unit selects the primary printing condition command in which the type specifying data string is made coincident with the generalized command, and the printing condition command converting unit performs permutation processing of the selected and coincident conversion target command by the representative command.

8. The printing system according to claim 5, wherein the printing condition command converting unit makes a pair of printing condition commands composed of a conversion target command and a printing condition command the type specifying data string of which is different form that of the conversion target command, and the printing apparatus performs the processing related to printing based on the pair of printing condition commands.

9. The printing system according to claim 8, wherein the conversion target command regulates the type of sheet feed tray of the printing apparatus, and the printing condition command specifies the type of printing sheets.

10. The printing system according to claim 1, wherein the contents of the conversion processes with respect to the primary printing condition commands corresponding to the respective conversion permission conditions set by the conversion permission condition setting unit are defined by a plurality of sets, a conversion contents selecting unit is provided which selects one of the plurality of sets of conversion processes, and the printing condition command converting unit converts the primary printing condition commands to the secondary printing condition commands in compliance with the conversion process thus selected.

11. The printing system according to claim 1, wherein, as one of the conversion permission conditions, the conversion permission condition setting unit comprises a conversion permitted interface setting unit that sets which one of receiving interfaces of the printing condition commands in the printing apparatus is made into a conversion permitted interface, and the conversion permitted determining unit detects in which one of a plurality of the receiving interfaces the printing condition commands are inputted, as a use status of the printing apparatus, and gives the printing condition command converting unit permission to execute the conversion process in the case where the receiving interface, in which input of the corresponding printing condition commands is detected, is made coincident with the conversion permitted interface.

12. The printing system according to claim 1, further comprising a user-specifying information inputting unit that inputs specific information of a user of the printing apparatus, wherein, as one of the conversion permission conditions, the conversion permission condition setting unit comprises conversion permitted user-specifying information setting unit that sets predetermined user-specifying information predetermined as specific information of conversion permission user, and the conversion permitted determining unit detects the user-specifying information inputted in the user-specifying information inputting unit, and gives the printing control data converting unit permission to execute the control data conversion process only in a case where the corresponding user-specifying information is made coincident with the conversion permitted user-specifying information.

13. The printing system according to claim 1, wherein, as one of the conversion permission conditions, the conversion permission condition setting unit comprises a conversion permitted job setting unit that sets a specified printing job of printing jobs using the printing condition command as a conversion permitted job, and the conversion permitted determining unit acquires a printing job specifying information that the corresponding printing apparatus receives, as a use status of the printing apparatus, and gives the printing condition command converting unit permission to execute the conversion process in a case where the printing job specified by the printing job specifying information is made coincident with the set conversion permitted job.

14. The printing system according to claim 1, wherein, as one of the conversion permission conditions, the conversion permission condition setting unit comprises a conversion permitted emulation mode setting unit that sets a specified emulation mode of conversion permitted emulation modes, in which the printing apparatus performs the printing process, as a conversion permitted emulation mode, and the conversion permitted determining unit acquires an emulation mode that is designated so that the corresponding printing apparatus uses for execution of the processing related to printing as a use status of the printing apparatus, and gives the printing condition command converting unit permission to execute the conversion process in a case where the corresponding emulation mode is made coincident with the set conversion permitted emulation mode.

15. The printing system according to claim 1, wherein the conversion permitted determining unit gives the printing condition command converting unit permission to execute the conversion process in a case where the plurality of predetermined conversion permission conditions are simultaneously satisfied.

16. The printing system according to claim 1, further comprising a conversion inhibition setting unit that sets conversion inhibition to inhibit execution of the conversion process by the printing condition command converting unit regardless of the use status of the printing apparatus, wherein the conversion inhibition is set by the conversion inhibition setting unit, the conversion permitting unit causes the printing condition command converting unit to inhibit execution of the conversion process regardless of the setting contents by the conversion permission condition setting unit.

17. The printing system according to claim 1, wherein the printing apparatus performs the processing related to printing based on the secondary printing condition commands obtained by the conversion process by the printing condition command converting unit where execution of the conversion process is permitted, and performs the processing related to printing based on the primary printing condition commands where the execution of the conversion process is not permitted.

18. A printing apparatus comprising:
a printing condition command receiving unit that receives a primary printing condition command, the primary condition command being included together with printing image data in printing control data;
a printing condition command converting unit that converts the received primary printing condition command to a secondary printing condition command corresponding to the printing apparatus;
a printing processing unit that carries out processing related to printing the print image data based on the secondary printing condition command;
a conversion permission condition setting unit that sets predetermined conversion permission conditions satisfied by a use status of the printing apparatus;
a conversion permitted determining unit that detects the use status of the printing apparatus and determines whether or not the corresponding use status thus detected satisfies the predetermined conversion permission establishing conditions; and
a conversion permitting unit that permits execution of a conversion process to the printing condition command converting unit to convert the primary printing condition commands to the secondary condition commands when it is determined by the conversion permitted determining unit that the conversion permission conditions are sufficient.

* * * * *